(12) United States Patent
Umebayashi

(10) Patent No.: US 7,143,643 B2
(45) Date of Patent: Dec. 5, 2006

(54) SPRING LOAD CORRECTION METHOD AND DEVICE

(75) Inventor: Akira Umebayashi, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 109 days.

(21) Appl. No.: 10/854,756

(22) Filed: May 27, 2004

(65) Prior Publication Data

US 2004/0261514 A1    Dec. 30, 2004

(30) Foreign Application Priority Data

May 27, 2003   (JP) .............................. 2003-149721

(51) Int. Cl.
*G01L 1/04* (2006.01)
(52) U.S. Cl. ...................................... 73/161
(58) Field of Classification Search ................... 73/161
See application file for complete search history.

(56) References Cited

U.S. PATENT DOCUMENTS 3,803,887 A * 4/1974 Kitanosono ................... 72/9.2

2003/0034183 A1 * 2/2003 Kortesmaki ................. 177/142

FOREIGN PATENT DOCUMENTS

| JP | 62-018685 | | 1/1987 |
| JP | 6-44760 | | 2/1994 |
| JP | 7-130116 | * | 5/1995 |
| JP | 7-77063 | | 8/1995 |
| JP | 9-257648 | * | 3/1996 |

OTHER PUBLICATIONS

Official Action in Chinese patent application No. 2004100476207 (date mailed: Aug. 25, 2006).
Partial English translation of the Official Action.

* cited by examiner

*Primary Examiner*—Max Noori
(74) *Attorney, Agent, or Firm*—Armstrong, Kratz, Quintos, Hanson & Brooks, LLP

(57) ABSTRACT

A spring has a fixed end and a free end, the free end when elevated to a specific elevation from the fixed end produces a load on an object. A spring constant of the spring is calculated, a load correction amount for correcting load of the spring is calculated using the spring constant, and the spring based on the load correction amount.

12 Claims, 20 Drawing Sheets

FIG.9

| PT: TARGET LOAD (gf) | 2.49 | INPUT VALUE |
| --- | --- | --- |
| δT: SET HEIGHT (mm) | 0.48 | INPUT VALUE |

REFERENCE HEIGHT IS ZERO, DIRECTION OF WEAK LOAD IS PLUS
−IS DIRECTION IN WHICH SPRING IS SUBJECTED TO SETTING

| | P1: HIGH LOAD | | P2: LOW LOAD | | INCLINATION | Y INTERCEPT | LOAD BEFORE CORRECTION gf | HEIGHT AT TARGET LOAD μm | CORRECTION TARGET μm | CORRECTION RESULT μm | P3: LOAD MEASUREMENT AFTER CORRECTION | | NEW Y INTERCEPT | LOAD AFTER CORRECTION (gf) |
| --- | --- | --- | --- | --- | --- | --- | --- | --- | --- | --- | --- | --- | --- | --- |
| | LOAD (gf) | HEIGHT (μm) | LOAD (gf) | HEIGHT (μm) | a | b | PA | δA | δC | | LOAD (gf) | HEIGHT (μm) | b' | PA' |
| | PH | δL | PL | δH | | | | | | | P' | δ' | | |
| DATA | 2.951 | 387 | 1.544 | 1036 | −461 | 1748 | 2.749 | 600 | −120 | −118 | 2.495 | 480 | 1631 | 2.495 |
| | (1) | | | | | (2) | (3) | (4) | (5) | | | | (6) | (7) |

FIG.10

TYPE NAME

TARGET LOAD(gf): 2.5  INPUT VALUE

SET HEIGHT(mm): 0.48  INPUT VALUE

REFERENCE HEIGHT IS ZERO, −IS DIRECTION IN WHICH SPRING
DIRECTION OF WEAK LOAD IS PLUS   IS SUBJECTED TO SETTING

| NUMBER | HIGH LOAD | | LOW LOAD | | LOAD BEFORE CORRECTION gf | CORRECTION TARGET μm | CORRECTION RESULT μm | LOAD MEASUREMENT AFTER CORRECTION | | LOAD AFTER CORRECTION (gf) |
|---|---|---|---|---|---|---|---|---|---|---|
| | LOAD(gf) | HEIGHT (μm) | LOAD(gf) | HEIGHT (μm) | | | | LOAD(gf) | HEIGHT (μm) | |
| 1 | 3.065 | 382 | 1.592 | 1029 | 2.842 | −150 | −155 | 2.557 | 460 | 2.511 |
| 2 | 3.072 | 383 | 1.596 | 1029 | 2.850 | −153 | −155 | 2.537 | 459 | 2.489 |
| 3 | 2.977 | 380 | 1.516 | 1025 | 2.750 | −111 | −110 | 2.566 | 460 | 2.521 |
| 4 | 3.073 | 383 | 1.565 | 1028 | 2.846 | −148 | −145 | 2.574 | 458 | 2.523 |
| 5 | 3.002 | 380 | 1.507 | 1025 | 2.770 | −117 | −116 | 2.534 | 458 | 2.483 |
| 6 | 3.109 | 383 | 1.604 | 1029 | 2.883 | −164 | −162 | 2.576 | 459 | 2.527 |
| 7 | 2.993 | 380 | 1.541 | 1026 | 2.768 | −119 | −118 | 2.564 | 458 | 2.515 |
| 8 | 3.047 | 381 | 1.558 | 1026 | 2.818 | −138 | −141 | 2.562 | 460 | 2.516 |
| 9 | 3.082 | 383 | 1.603 | 1027 | 2.859 | −156 | −159 | 2.556 | 459 | 2.508 |
| 10 | 3.080 | 382 | 1.587 | 1028 | 2.854 | −153 | −148 | 2.558 | 458 | 2.507 |
| | 0.930 | | 0.230 | | | | | | 0.830 | |

HIGH LOAD / LOW LOAD:
AVERAGE / SIGMA / R

LOAD BEFORE CORRECTION: AVERAGE 2.824, SIGMA 0.045, R 0.133

LOAD AFTER CORRECTION: AVERAGE 2.510, SIGMA 0.014, R 0.044

FIG.11

| NUMBER | HIGH LOAD | | LOW LOAD | | LOAD BEFORE CORRECTION gf | CORRECTION TARGET μm | CORRECTION RESULT μm | LOAD MEASUREMENT AFTER CORRECTION | | LOAD AFTER CORRECTION (gf) |
|---|---|---|---|---|---|---|---|---|---|---|
| | LOAD(gf) | HEIGHT (μm) | LOAD(gf) | HEIGHT (μm) | | | | LOAD(gf) | HEIGHT (μm) | |
| 1 | 2.906 | 374 | 1.503 | 1027 | 2.678 | -83 | -83 | 2.534 | 474 | 2.521 |
| 2 | 2.908 | 375 | 1.505 | 1028 | 2.682 | -85 | -92 | 2.524 | 473 | 2.509 |
| 3 | 2.973 | 378 | 1.534 | 1028 | 2.747 | -112 | -111 | 2.524 | 473 | 2.509 |
| 4 | 3.052 | 381 | 1.608 | 1031 | 2.832 | -149 | -151 | 2.540 | 475 | 2.529 |
| 5 | 2.960 | 377 | 1.558 | 1029 | 2.739 | -111 | -112 | 2.522 | 474 | 2.509 |
| 6 | 2.910 | 375 | 1.560 | 1029 | 2.693 | -94 | -93 | 2.533 | 474 | 2.521 |
| 7 | 2.888 | 374 | 1.511 | 1029 | 2.665 | -79 | -83 | 2.528 | 474 | 2.515 |
| 8 | 2.937 | 378 | 1.509 | 1028 | 2.713 | -97 | -97 | 2.502 | 473 | 2.487 |
| 9 | 3.021 | 380 | 1.552 | 1028 | 2.794 | -130 | -130 | 2.539 | 473 | 2.523 |
| 10 | 3.002 | 378 | 1.520 | 1027 | 2.769 | -118 | -117 | 2.529 | 474 | 2.515 |
| | | 0.930 | | 0.230 | | | | | 0.820 | |

| | |
|---|---|
| AVERAGE | 2.731 |
| SIGMA | 0.055 |
| R | 0.167 |

| | |
|---|---|
| AVERAGE | 2.514 |
| SIGMA | 0.012 |
| R | 0.042 |

FIG.12

| NUMBER | HIGH LOAD | | LOW LOAD | | LOAD BEFORE CORREC-TION gf | CORREC-TION TARGET μm | CORREC-TION RESULT μm | LOAD MEASUREMENT AFTER CORRECTION | | LOAD AFTER CORREC-TION (gf) |
|---|---|---|---|---|---|---|---|---|---|---|
| | LOAD(gf) | HEIGHT (μm) | LOAD(gf) | HEIGHT (μm) | | | | LOAD(gf) | HEIGHT (μm) | |
| 1 | 2.985 | 385 | 1.534 | 1038 | 2.774 | -123 | -123 | 2.507 | 480 | 2.507 |
| 2 | 3.014 | 385 | 1.632 | 1040 | 2.814 | -149 | -147 | 2.519 | 480 | 2.519 |
| 3 | 3.010 | 386 | 1.588 | 1038 | 2.805 | -140 | -141 | 2.511 | 480 | 2.511 |
| 4 | 2.992 | 385 | 1.557 | 1038 | 2.783 | -129 | -130 | 2.512 | 479 | 2.510 |
| 5 | 2.918 | 382 | 1.534 | 1037 | 2.711 | -100 | -100 | 2.505 | 479 | 2.503 |
| 6 | 2.997 | 386 | 1.601 | 1039 | 2.796 | -138 | -138 | 2.509 | 478 | 2.505 |
| 7 | 3.035 | 387 | 1.584 | 1038 | 2.828 | -147 | -145 | 2.501 | 480 | 2.501 |
| 8 | 2.930 | 382 | 1.562 | 1038 | 2.726 | -108 | -107 | 2.514 | 480 | 2.514 |
| 9 | 2.996 | 384 | 1.554 | 1038 | 2.784 | -129 | -131 | 2.514 | 479 | 2.512 |
| 10 | 3.015 | 385 | 1.574 | 1035 | 2.804 | -137 | -134 | 2.512 | 481 | 2.514 |
| | | 0.930 | | 0.230 | | | | | 0.815 | |

| | AVERAGE | 2.782 | | | AVERAGE | 2.510 |
| | SIGMA | 0.037 | | | SIGMA | 0.006 |
| | R | 0.117 | | | R | 0.018 |

| TOTAL | AVERAGE | 2.779 | | TOTAL | AVERAGE | 2.511 |
| | SIGMA | 0.059 | | | SIGMA | 0.011 |
| | R | 0.218 | | | R | 0.046 |

FIG. 13

EXPERIMENT IN WHICH TARGET IS LOWERED TO 2.49
(BECAUSE THE AVERAGE WAS HIGHER IN THE PAST EXPERIMENTS)

TYPE NAME

| TARGET LOAD(gf) | 2.49 | INPUT VALUE |
| --- | --- | --- |
| SET HEIGHT(mm) | 0.48 | INPUT VALUE |

REFERENCE HEIGHT IS ZERO,
DIRECTION OF WEAK LOAD IS PLUS

−IS DIRECTION IN WHICH SPRING IS SUBJECTED TO SETTING

| NUMBER | HIGH LOAD | | LOW LOAD | | LOAD BEFORE CORRECTION gf | CORRECTION TARGET μm | CORRECTION RESULT μm | LOAD MEASUREMENT AFTER CORRECTION | | LOAD AFTER CORRECTION (gf) |
| --- | --- | --- | --- | --- | --- | --- | --- | --- | --- | --- |
| | LOAD(gf) | HEIGHT (μm) | LOAD(gf) | HEIGHT (μm) | | | | LOAD(gf) | HEIGHT (μm) | |
| 1 | 2.951 | 387 | 1.544 | 1036 | 2.749 | −120 | −118 | 2.495 | 480 | 2.495 |
| 2 | 2.998 | 389 | 1.553 | 1036 | 2.795 | −136 | −134 | 2.488 | 480 | 2.488 |
| 3 | 3.012 | 390 | 1.534 | 1036 | 2.806 | −138 | −140 | 2.492 | 479 | 2.490 |
| 4 | 3.030 | 391 | 1.627 | 1039 | 2.837 | −160 | −159 | 2.461 | 480 | 2.461 |
| 5 | 2.970 | 389 | 1.581 | 1036 | 2.775 | −133 | −133 | 2.469 | 479 | 2.467 |
| 6 | 2.983 | 390 | 1.620 | 1040 | 2.794 | −145 | −144 | 2.472 | 478 | 2.468 |
| 7 | 3.016 | 390 | 1.555 | 1036 | 2.812 | −143 | −141 | 2.492 | 480 | 2.492 |
| 8 | 2.998 | 390 | 1.591 | 1037 | 2.802 | −144 | −142 | 2.479 | 479 | 2.477 |
| 9 | 3.031 | 391 | 1.607 | 1038 | 2.835 | −157 | −158 | 2.471 | 478 | 2.467 |
| 10 | 2.993 | 388 | 1.559 | 1036 | 2.789 | −135 | −138 | 2.480 | 476 | 2.471 |
| | | 0.930 | | 0.230 | | | | | 0.815 | |

| | AVERAGE | 2.800 |
| --- | --- | --- |
| | SIGMA | 0.026 |
| | R | 0.088 |

| | AVERAGE | 2.477 |
| --- | --- | --- |
| | SIGMA | 0.013 |
| | R | 0.034 |

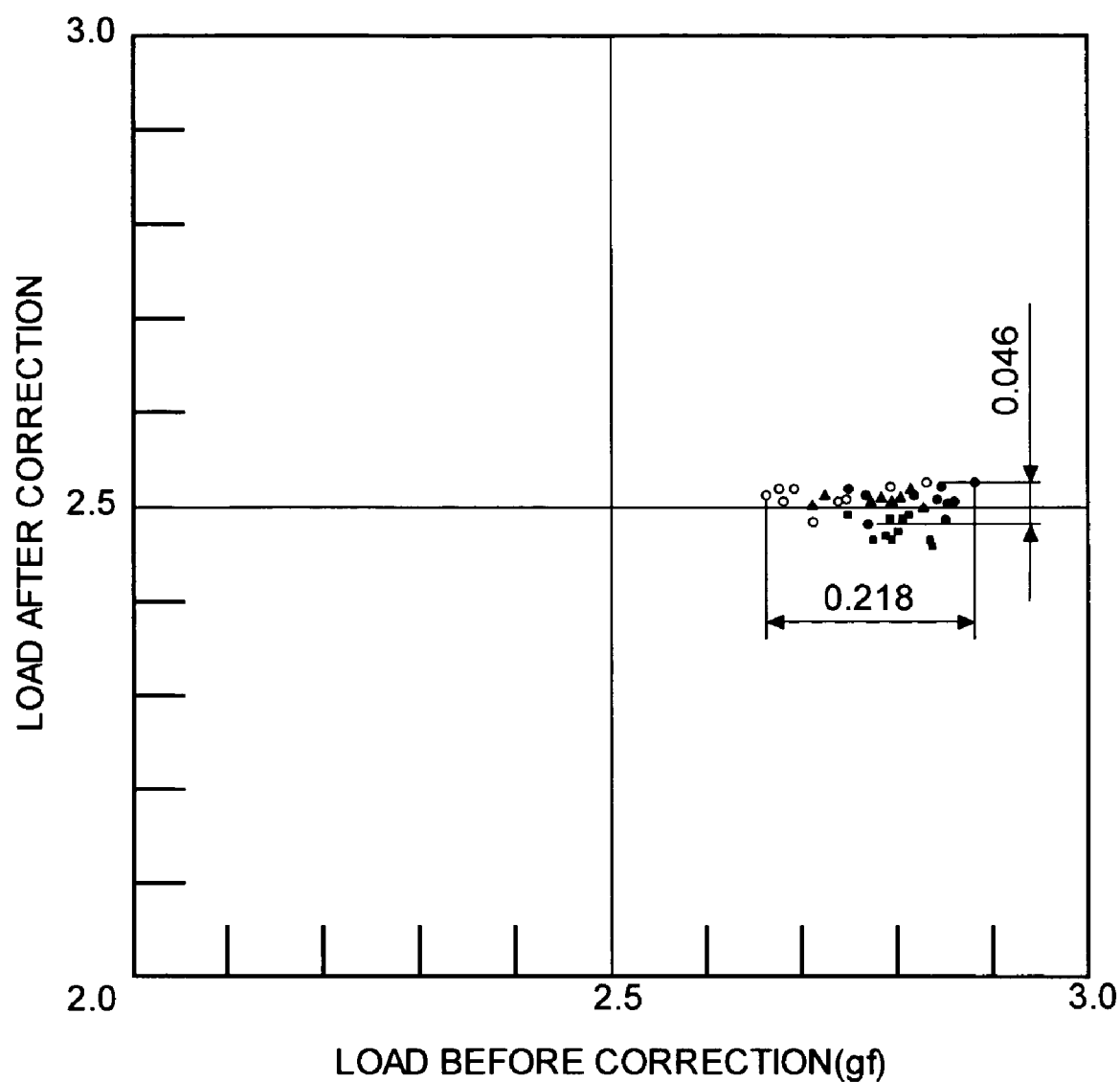

| BEFORE CORRECTION | | AFTER CORRECTION (TARGET : 2.49) | |
|---|---|---|---|
| AVERAGE | 2.800 | AVERAGE | 2.477 |
| SIGMA | 0.026 | SIGMA | 0.013 |
| R | 0.088 | R | 0.034 |

SPRING LOAD CORRECTION METHOD AND DEVICE

BACKGROUND OF THE INVENTION

1) Field of the Invention

The present invention relates to a technology for measuring load on a spring. More specifically, the present invention relates to technology for measuring the load on a leaf spring (suspension) that supports the magnetic head in a hard disk drive (HDD).

2) Description of the Related Art

In many cases it is necessary to measure the load on a spring. For example, it is necessary to measure the load on a suspension, which supports the magnetic head in the HDD.

In accordance with dramatic improvement in a recording density of the HDD, it has become necessary to accurately manufacture the suspension. An amount of levitation of the magnetic head at the time of recording and reproduction depends on how much load there is on the suspension in a stationary state. Consequently, a head load of the suspension significantly affects a levitation posture and a levitation characteristic of the magnetic head. Therefore, head load of each suspension is measured when manufacturing the suspension.

FIG. 18 is a schematic for explaining a relation between a suspension 200 of a magnetic disk 21. It is assumed here that the magnetic disk 21 is not rotating. The suspension 200 includes a support 24 that supports a base plate 201, and a load beam 203 that is attached to the base plate 201 via a leaf spring section 202. A flexure 209 is attached to the load beam 203.

A slider 210 is attached to an upper surface of the flexure 209. The slider 210 slides with respect to a surface of the magnetic disk 21. A magnetic read/write head (not shown) is housed inside the slider 210. A sliding surface of the magnetic head opposed to the magnetic disk 21 is the slider 210. A dimple 208a is provided at a tip of the load beam 203 and it is in contact with the flexure 209. The dimple 208a serves as a rotation fulcrum for the slider 210.

The load beam 203 is elastically supported by the leaf spring section 202. Therefore, when the magnetic disk 21 is not rotating, the slider 210 is pressed against the magnetic disk 21 due to the force of the leaf spring 202. The contact load, when the magnetic disk 21 is not rotating, with which the slider 210 is pressed against the magnetic disk 21 will be called the head load.

When the magnetic disk 21 rotates, the slider 210 is pushed away from the magnetic disk 21 because of an airflow that is generated because of the rotation of the magnetic disk 21. In other words, the slider 210 levitates below (or above) the magnetic disk 21. Recording and/or reproduction of information from/in the magnetic disk 21 is performed in this manner. The amount of levitation depends on the buoyant force and a force caused by the bending of the suspension. In general, this amount of levitation is several nanometers to several tens nanometers.

The head load has been conventionally measured by a method as described below. This method is disclosed, for example, in Japanese Patent Application Laid-Open Publication No. H6-44760.

Note that, in an example described below, an object of measurement of the heat load is the suspension 200 not yet mounted with the slider 210. When the suspension 200 mounted with the slider 210 is an object of measurement, it is possible to measure the head load with the same method except that only a thickness (Z210 in FIG. 19) of the slider 210 has to be taken into account.

In FIG. 19, reference numeral 200a denotes the suspension 200 at the time when it is free (no load state). Reference numeral 200b denotes the suspension 200 at the time when the slider 210 is in contact with the magnetic disk 21 at the time of rotation stop (the same state as FIG. 18). A load given to the magnetic disk 21 by the suspension 200b via the slider 210 is the head load.

Reference sign Zf denotes a height of a flexure 209a of the suspension 200a at the time when it is free from a reference plane 25a of the fixed support 24. Reference sign Z21 denotes a height of a lower surface of the magnetic disk 21 (a surface in contact with the magnetic disk 21) from the reference plane 25a. Reference sign Zh denotes a height of a flexure 209b of the suspension 200b, which presses the slider 210 against the magnetic disk 21 at the time of rotation stop, from the reference plane 25a. The height Z21 of the lower surface of the magnetic disk 21 is (Zh+Z210).

Therefore, in measuring the head load of the suspension 200, as shown in FIGS. 8 and 9, in a state in which a load probe 310 of a load cell 300 is in contact with the flexure 209, the load cell 300 only has to be lowered to depress the flexure 209 to a position of the height Zh and measure a load (reaction) from the flexure 209 in that state with the load cell 300. In the following description, a more specific method of measuring a head load will be explained with reference to FIG. 21:

(1) first, prepare a suspension 200M (master workpiece), a load of which is known in advance;

(2) nip the master workpiece 200M with a workpiece clamp 400 and press the master workpiece 200M upward to fix it on a reference plane 401;

(3) move a load cell 420 upward with a vertical movement unit 410 such as an air cylinder to bring a load probe 425 of the load cell 420 into contact with the master workpiece 200M;

(4) move up and down an ascending-end stopper 430 to adjust a height of the load cell 420 while monitoring a load outputted by the load cell 420, and fix the ascending-end stopper 430 at a position where the load outputted by the load cell 420 coincides with the known load of the master workpiece 200M (completion of the adjustment of a height of the load cell 420);

(5) lower the load cell 420 and also lower the workpiece clamp 400 to release the master workpiece 200M;

(6) fix the suspension 200, which is the object of measurement, on the reference plane 401 with the workpiece clamp 400;

(7) lift the load cell 420 to bring it into abutment against the ascending-end stopper 430 which has been adjusted in (4) above; and (8) obtain a load outputted by the load cell 420 in the state of (7) as a head load of the suspension 200.

When the load of the suspension 200 is measured as described above, a result of the measurement is compared with a proper load to correct the suspension 200 such that the proper load is obtained. In recent years, a technique for irradiating a laser beam on the suspension 200 and utilizing thermal deformation of an irradiated portion to correct a load has been proposed.

As such a correction technique, a technique disclosed in Japanese Patent Application Publication No. H7-77063 is known. In this technique, a laser beam is irradiated in a width direction of a spring arm to correct a load such that a specified contact pressure is obtained.

However, the conventional technique does not give accurate results. In particular, in a suspension that supports a magnetic head, accuracy required in measurement of a head load is extremely high. Whereas a load required of the suspension was about 3±1.5 grams-force (gf) or 2.5±0.4 gf in the past, the load is measured at accuracy of as high as, for example, 0.4±0.04 gf recently.

SUMMARY OF THE INVENTION

It is an object of the present invention to increase the accuracy of measurement of the load on the spring.

A method according to an aspect of the present invention is a method of correcting a spring, the spring having a fixed end and a free end, the free end when elevated to a specific elevation from the fixed end produces a load on an object. The method includes calculating a spring constant of the spring; calculating a load correction amount for correcting load of the spring using the spring constant; and correcting the spring based on the load correction amount.

A method according to another aspect of the present invention is a method of correcting load of a spring, the spring having a fixed end and a free end, the free end when elevated to a specific elevation from the fixed end produces a load on an object. The method includes calculating a spring constant of the spring; calculating, using the spring constant, a load of the spring when the free end is elevated to the specific elevation; and correcting the spring based on the calculated load.

A method according to still another aspect of the present invention is a method of correcting a suspension including a suspension body, which is provided with a magnetic head, and a chip tab unit, which is formed in the suspension body so as to have a step height. The method includes (t) calculating a spring constant of the suspension; (u) measuring a load of the chip tab unit with a load probe; (v) measuring an elevation of the magnetic head in a state when the (u) is performed; (w) multiplying the load measured at (u) by a lever ratio of the load probe and a dimple position to calculate a load at a position of the magnetic head; and (x) correcting a load equivalent to an elevation error in the measuring an elevation of the magnetic head based on the spring constant calculated.

A method according to still another aspect of the present invention is a method of correcting load of a spring, the spring having a fixed end and a free end, the free end when elevated to a specific elevation from the fixed end produces a load on an object. The method includes bringing a load measurement device into contact with the free end of the spring directly or indirectly and measuring an elevation of a specific portion of the load measurement device; measuring a load of the spring, when the free end is at the specific elevation, using a result of the measurement of the elevation of the specific portion of the load measurement device; and correcting the spring using the load measured.

A method according to still another aspect of the present invention is a method of correcting load of a spring, the spring having a fixed end and a free end, the free end when elevated to a specific elevation from the fixed end produces a load on an object. The method includes bringing a load measurement device into contact with the free end of the spring and measuring an elevation of the free end of the spring; measuring a load of the spring, when the free end is at the specific elevation, using a result of the measurement of the elevation of the free end of the spring; and correcting the spring using the load measured.

A device according to still another aspect of the present invention is a device that corrects a spring, the spring having a fixed end and a free end, the free end when elevated to a specific elevation from the fixed end produces a load on an object. The method includes a spring constant calculating unit that calculates a spring constant of the spring; a correction amount calculating unit that calculates a load correction amount for correcting load of the spring using the spring constant; and a correcting unit that corrects the spring based on the load correction amount.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 9 is a diagram for explaining a specific procedure of the load correction method according to the embodiment;

FIG. 10 is a diagram for explaining effects of the spring load correction method according to the embodiment;

FIG. 11 is a diagram for explaining the effects of the spring load correction method according to the embodiment;

FIG. 12 is a diagram for explaining the effects of the spring load correction method according to the embodiment;

FIG. 13 a diagram for explaining the effects of the spring load correction method according to the embodiment;

FIG. 14 is a graph for explaining the effects of the spring load correction method according to the embodiment;

DETAILED DESCRIPTION

Exemplary embodiments of the present invention will be hereinafter explained in detail with reference to the accompanying drawings. Note that the present invention is not limited by the embodiments.

A method of correcting a load of a suspension will be explained as an embodiment of a method of correcting a load of a spring according to the present invention. First, a load of a suspension, which is an object of measurement, is measured, and then the load of the suspension is corrected so as to be a set appropriate load. In the correction, it is a minimum requirement that the load of the suspension, which is an object of measurement, is measured accurately.

First, a premise leading to the embodiments will be explained.

Figure 20:
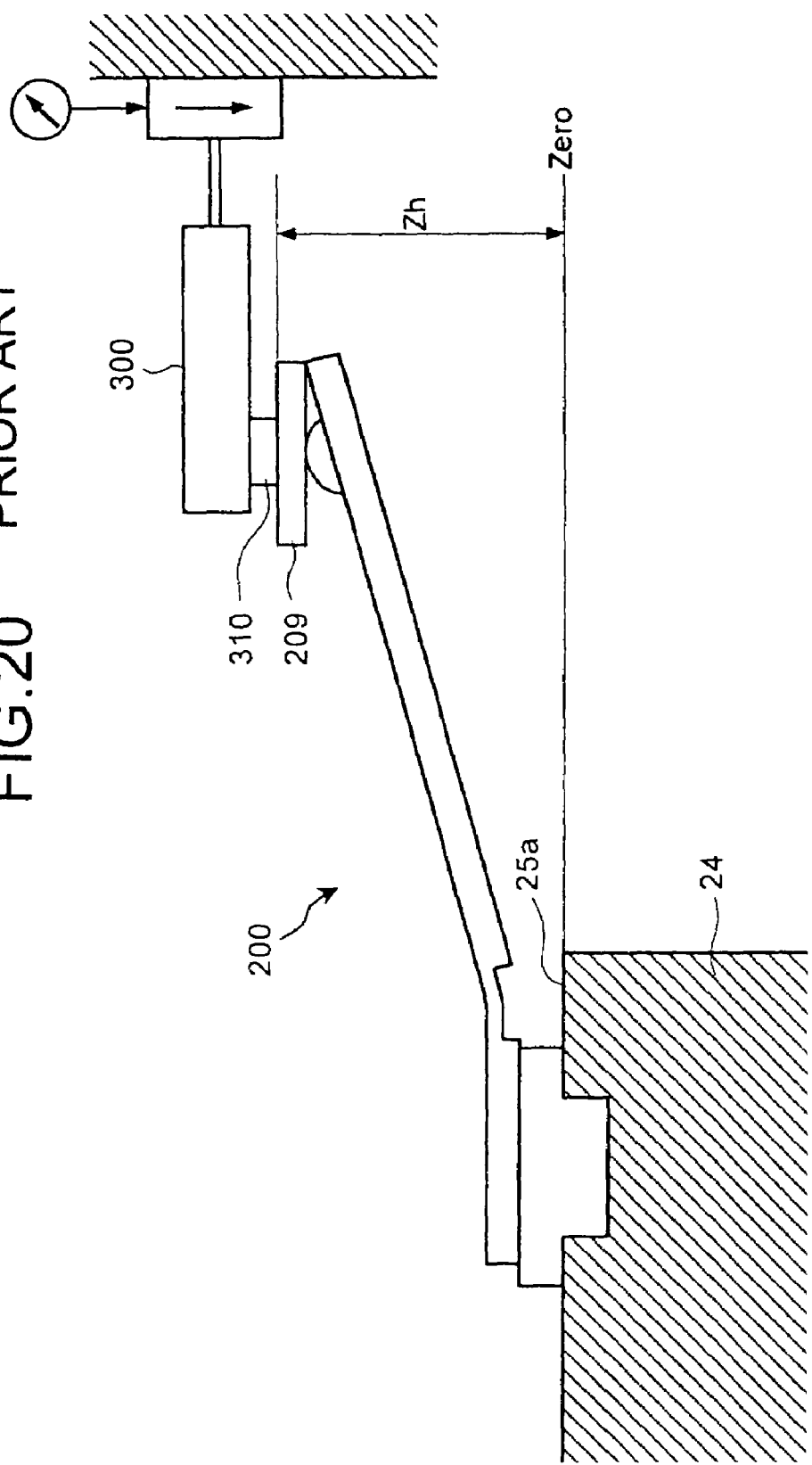
FIG. 20 is a side view showing a method of measuring a head load of the conventional suspension.

Accurate measurement cannot be performed with a conventional spring load measurement method shown in FIG. 20. This will be explained with reference to FIG. 1.

Conventionally, as shown in FIG. 20, in measuring a head load of a suspension 200, in a state in which a load probe 310 of a load cell 300 is in contact with a flexure 209, the load cell 300 is lowered to depress the flexure 209 to a position of a height Zh and measure a load from the flexure 209 in that state with the load cell 300.

Figure 1:
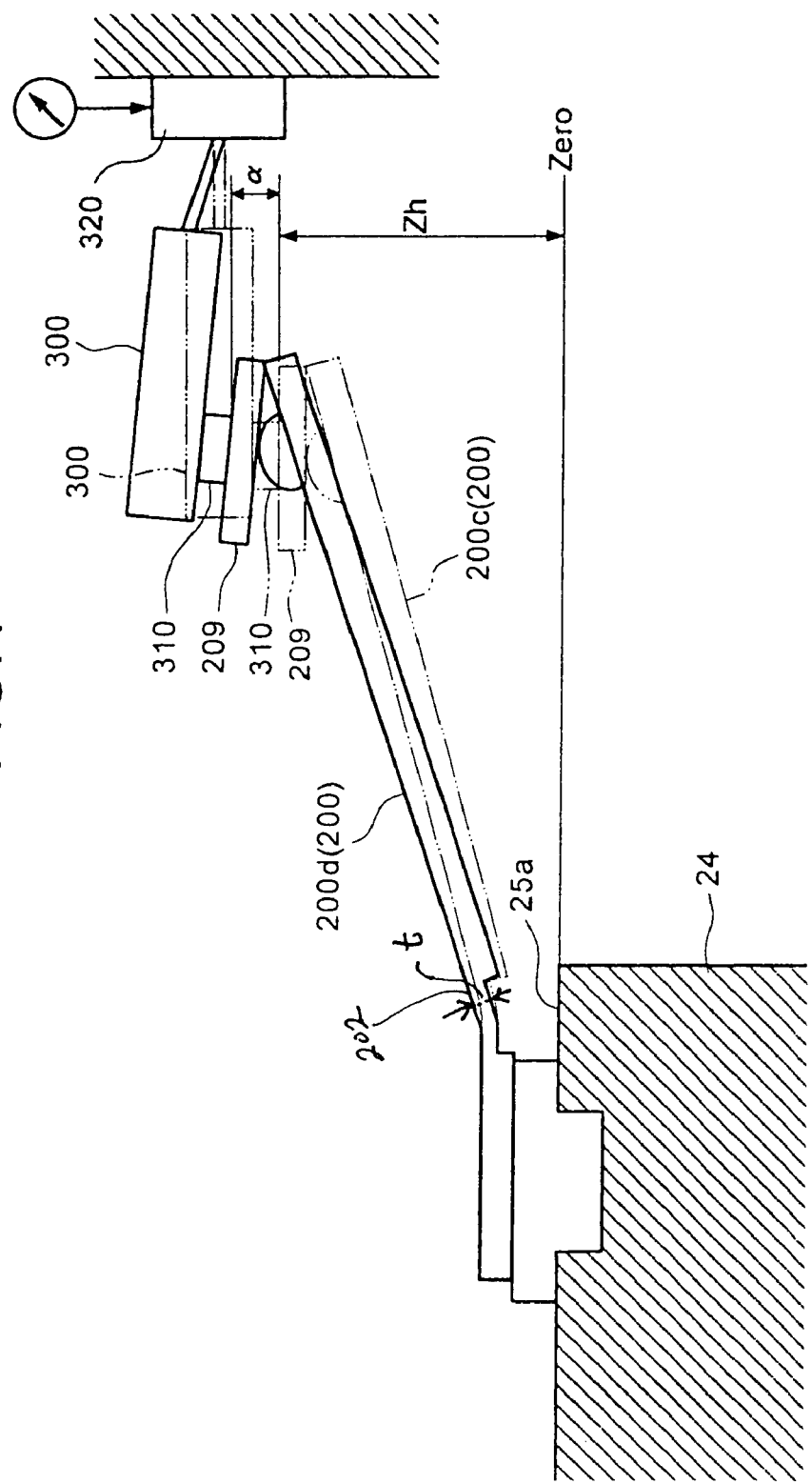
FIG. 1 is a side view for explaining the method of measuring the load on a spring according to an embodiment of the present invention.

However, in actual measurement, as shown in FIG. 1, a tip of the load cell 300 (the part of the load probe 310) is subject to a load from the flexure 209 and bends, and the flexure further separates from a reference plane 25a by α equivalent to an amount of the bending. In the above description, when the flexure 209 is depressed to the position of the height Zh, conventionally, an amount of depression of the flexure 209 (height of the load cell 300) is determined based on a height of a housing 320 of the load cell.

Since the amount of depression is determined based on the height of the housing 320 of the load cell 300 in this way, the bending of the tip of the load cell 300 is not taken into account. Consequently, the load cell 300 actually measures a load at a height of (Zh+α) from the reference plane 25a, and a load smaller than an actual load at the height Zh, at which it is truly desired to measure a load, is outputted.

In addition, the suspension 200 has a tolerance of the height Zf at the time when it is free, a tolerance of a length in a longitudinal direction, and the like. The amount of bending α at the tip of the load cell 300 varies depending on the suspension 200 and affects the height of the flexure 209, differently.

Therefore, accurate measurement cannot be performed with the conventional method.

This will be hereinafter verified using specific numerical values.

A suspension with 2.5 grams-force is measured using a load cell with a rated capacity of 10 grams-force and a rated displacement amount of ±0.4 millimeters (mm). Note that a spring constant of the suspension is assumed to be 2.3 gf/mm. When a suspension with 2.7 grams-force is measured in this setting, the following relation is obtained:

$$0.4:10=X:(2.7-2.5)$$

where X is 0.008 (a tip of the load cell bends away from the suspension by 0.008 mm).

This is converted into a load as follows:

$$P=0.008 \times 2.3 = 0.018 \text{ gf}$$

A load to be outputted by the load cell is smaller than an actual load by about 0.02 gf.

Some suspensions have a load tolerance of ±0.04 gf. In this case, practical measurement cannot be performed.

The tip of the load cell 300 is subjected to the load of the spring and bends as described above, whereby accurate measurement for the spring is prevented. Thus, it is conceivable to measure a load of the spring accurately using a load cell having a tip that does not easily bend (with less bending).

However, when the same suspension 200 is measured using a load cell with a characteristic of small bending and a load cell with a characteristic of large bending, an output level of the load cell with the characteristic of small bending is smaller than an output level of the load cell with the characteristic of large bending. Since the output level is small in the load cell with the characteristic of small bending, there is only a small difference between an output level at the time when no load is applied to the load cell and an output level at the time when a load is applied to the load cell. When the difference in the output level is small, the load cell is easily affected by noise (has a low SN ratio) and cannot measure a load accurately.

As described above, an amount of bending and the SN ratio are in a relation of tradeoff. Therefore, a method of measuring a spring load, with which a load can be measured accurately, is required even if a load cell has a large amount of bending.

Figure 2:
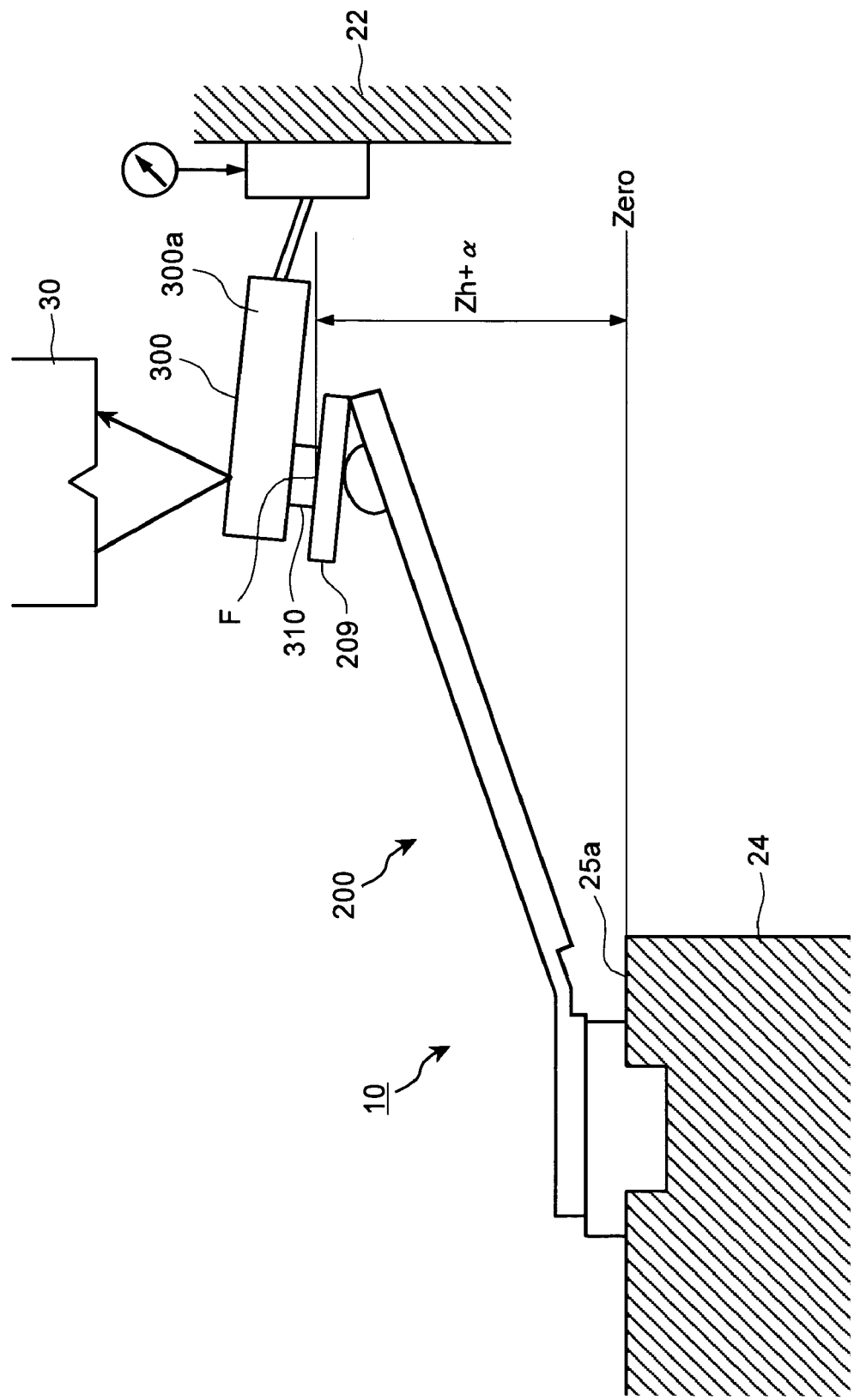
FIG. 2 is another side view for explaining the method of measuring the load on a spring according to an embodiment of the present invention.

FIG. 2 is a spring load measurement method as a step of a spring load correction method according to a first embodiment of the present invention.

As shown in FIG. 2, a workpiece clamp unit 10, which clamps a suspension 200 that is an object of measurement, a load cell 300, which is capable of moving up and down along a column 22, and a measurement unit 30, which measures a height of a tip of the load cell 300 (the part of a load probe 310), are provided. Note that, in this embodiment, the load cell 300 is used as an example of a load measurement device. However, a load measurement device of the present invention is not limited to the load cell 300.

This measurement unit 30 is preferably a non-contact type displacement gauge such as a laser that can perform the measurement even if the height or the load of the object changes. A position of this measurement unit 30 is fixed. When the height of the tip of the load cell 300 changes, for example, a laser beam is irradiated from the laser displacement gauge 30, and a position where reflection of the laser beam (a return position, a return angle, etc.) changes. The measurement unit 30 detects the height of the tip of the load cell 300 according to the change in the position.

In the spring load measurement step according to this embodiment, a height of the tip of the load cell 300 is measured, whereby a height of a flexure 209 including an amount of bending (α) (Zh+α) is calculated. In this case, a measurement position is a pressurizing point F where the flexure 209 pressurizes the load cell 300.

Thicknesses of the load probe 310 and a load cell body 300a are fixed. Thus, when a laser beam is irradiated on an upper surface of the load cell body 300a (right above the pressurization point F where the flexure 209 pressurizes the load cell 300), the height (Zh+α) of the flexure 209 can be calculated based on a position where reflection of the laser beam is received.

Next, a height of the load cell 300 is adjusted (in this case, the load cell 300 is lowered) based on the height of the tip of the load cell 300 detected by the laser displacement gauge 30 to set a height of the flexure 209 (the pressurizing point F where the flexure 209 pressurizes the load cell 300) to Zh. If an output (load) of the load cell 300 is calculated at that point, a head load of the suspension 200 can be calculated.

Note that a portion, where a height is detected by the laser displacement gauges 30, may be a portion of a suspension 200 instead of the tip of the load cell 300. In this case, a height near a portion, with which the load probe 310 of the flexure 209 is in contact, can be calculated by the laser displacement gauge 30. The height of the load cell 300 is adjusted (in this case, lowered) based on the height of the flexure 209 detected by the laser displacement gauge 30 to set the height of the flexure 209 (the pressurizing point F where the flexure 209 pressurizes the load cell 300) to Zh. If an output (load) of the load cell 300 at that point is calculated, a head load of the suspension 200 can be calculated.

With the conventional measurement method, since it is necessary to reduce bending (an amount of clearance) of the tip of the load cell 300 to control a measurement error, it is necessary to use a load cell with a characteristic of minimum bending. Thus, the load cell has a low output voltage and is susceptible to noise in measurement of a very small load.

On the other hand, in the spring load measurement step according to this embodiment, the height of the pressurizing point F, where the flexure 209 pressurizes the load cell 300 (the height Zh+α at F at the time when the tip of the load cell 300 bends), is measured. This makes it possible to use a load cell with a characteristic of large bending and increases a degree of freedom of design or selection of a load cell. As a result, accurate measurement resistant to noise can be performed.

Next, in this embodiment, the suspension 200 is corrected using a laser (not shown) based on the load of the suspension 200, which is measured accurately as described above, such that a load set as a target value is obtained.

In this embodiment, a load before correction (or during correction) of the suspension 200, which is an object of correction, can be measured accurately. Thus, an amount of correction, which is obtained from comparison of (difference between) a result of the measurement and a set value (target value), can be calculated accurately. As a result, accurate correction can be performed.

A second embodiment of the present invention will be explained with reference to FIGS. 3 to 6.

Figure 6:
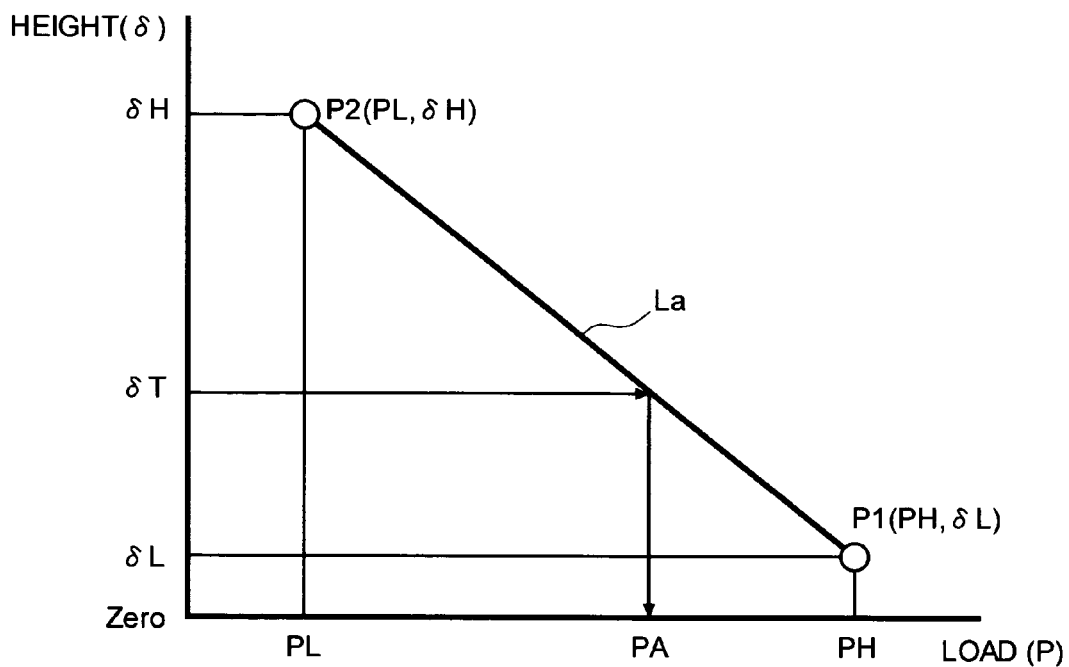
FIG. 6 is a graph showing a load-height diagram used in the spring load measurement method according to the embodiment.

Loads (PH and PL) are measured at heights (δH and δL) at two points above and below a target height (δT) in product design corresponding to a height at which a head load should be measured. In that case, since a tip of a load cell 300 bends away from a suspension 200 due to a reaction of a load, a height of the tip is measured. A load-height (bending) diagram of the suspension 200, which is an object of measurement, is prepared from the measured heights at two points (FIG. 6). The target height (δT) is inputted in this diagram to calculate a load (PA) at that height (δT) and set the load as a measurement value. Consequently, displacement of a portion to be deformed is measured directly such that an error due to the bending (deformation) of the tip of the load cell 300 does not occur, whereby the deformation does not affect the measurement of the height. This will be hereinafter explained more specifically.

In the second embodiment, a height of the tip of the load cell 300 is measured using a laser displacement gauge 30 as in the first embodiment.

In the second embodiment, sets of a load and a height at a pressurizing point, where the flexure 209 pressurizes the load cell 300, are measured at two points of different heights to prepare a load-height (bending) diagram based on a result of the measurement. A load (heat load) at a predetermined height (height Zh for measuring a head load) is calculated based on this load-height diagram. This calculated load at the predetermined height is an accurate value with bending (clearance) of the tip of the load cell 300 cancelled.

A procedure for adjusting the origin will now be explained in detail.

Figure 3:
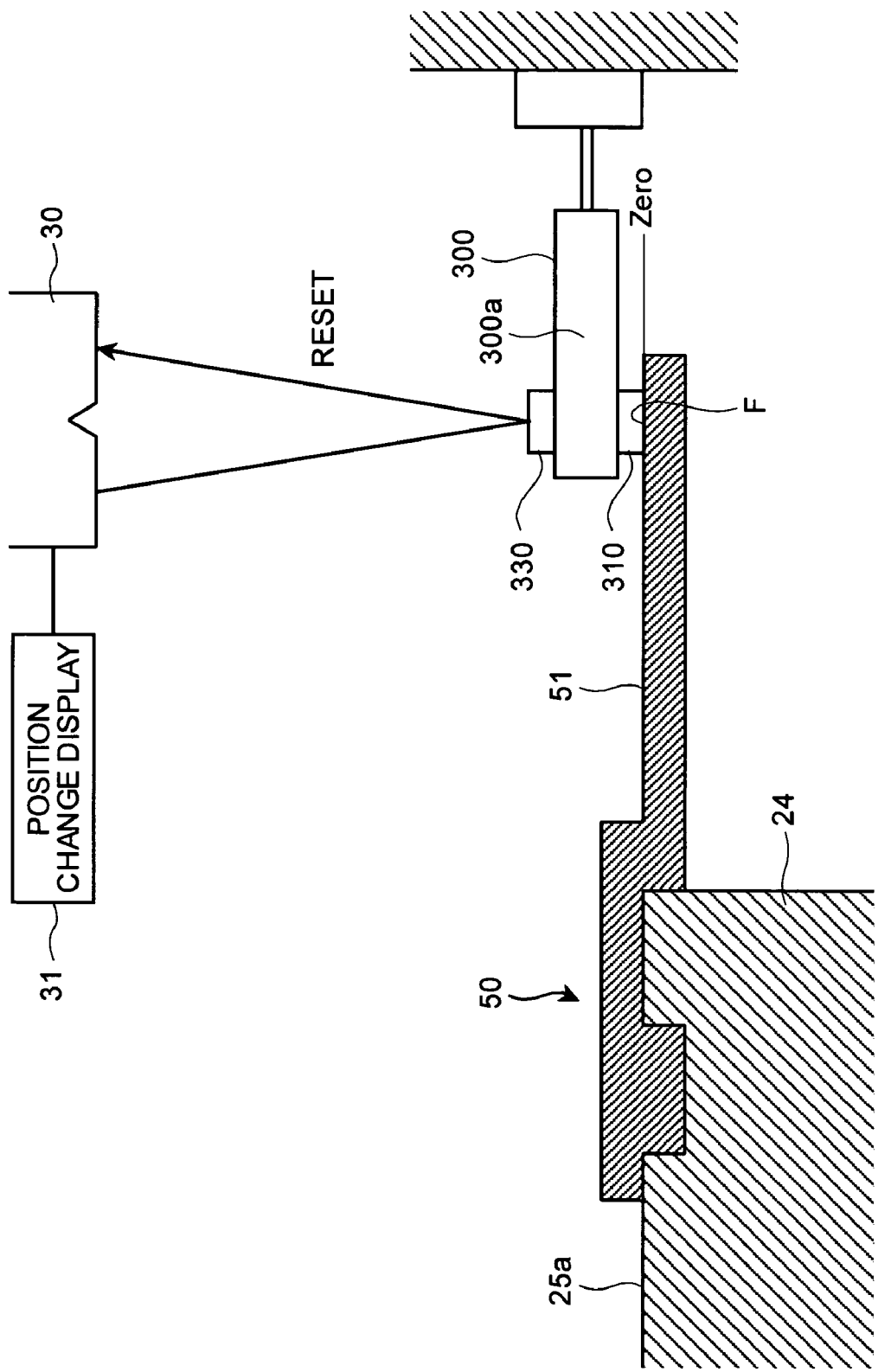
FIG. 3 is a side view showing a step of a spring load correction method according to another embodiment of the present invention.

As shown in FIG. 3, a zero adjustment gauge 50 is set on a support 24. The zero adjustment gauge 50 is constituted to have a surface 51 that is at the same height as a reference surface 25a when the zero adjustment gauge 50 is set on the support 24.

The height of the load cell 300 is adjusted to bring a load probe 310 of the load cell 300 into contact with the surface 51 of the zero adjustment gauge 50.

Then, in a state in which the load probe 310 of the load cell 300 starts to come into contact with the surface 51 of the zero adjustment gauge 50, a laser beam is irradiated on a laser irradiated section 330 of the load cell 300 from the laser displacement gauge 30. A position of the laser irradiated section 330 obtained from reflection of the laser beam is recorded as a height zero point (reference point).

Here, the laser irradiated section 330 is a section that is provided at a position right above the load probe 310 of the load cell 300 and set as a target of laser irradiation to thereby measure a height of a pressurizing point F where the flexure 209 pressurizes the load cell 300 (load probe 310). Note that a thickness of the load probe 310, a thickness of the load cell body 300a, and a thickness of the laser irradiated section 330 are fixed. The height of the pressurizing point F where the flexure 209 pressurizes the load cell 300 can be calculated by deducting a total of the thickness of the load probe 310, the thickness of the load cell body 300a, and the thickness of the laser irradiated section 330 from the thickness of the laser irradiated section obtained by the laser displacement gauge 30.

Figure 4:
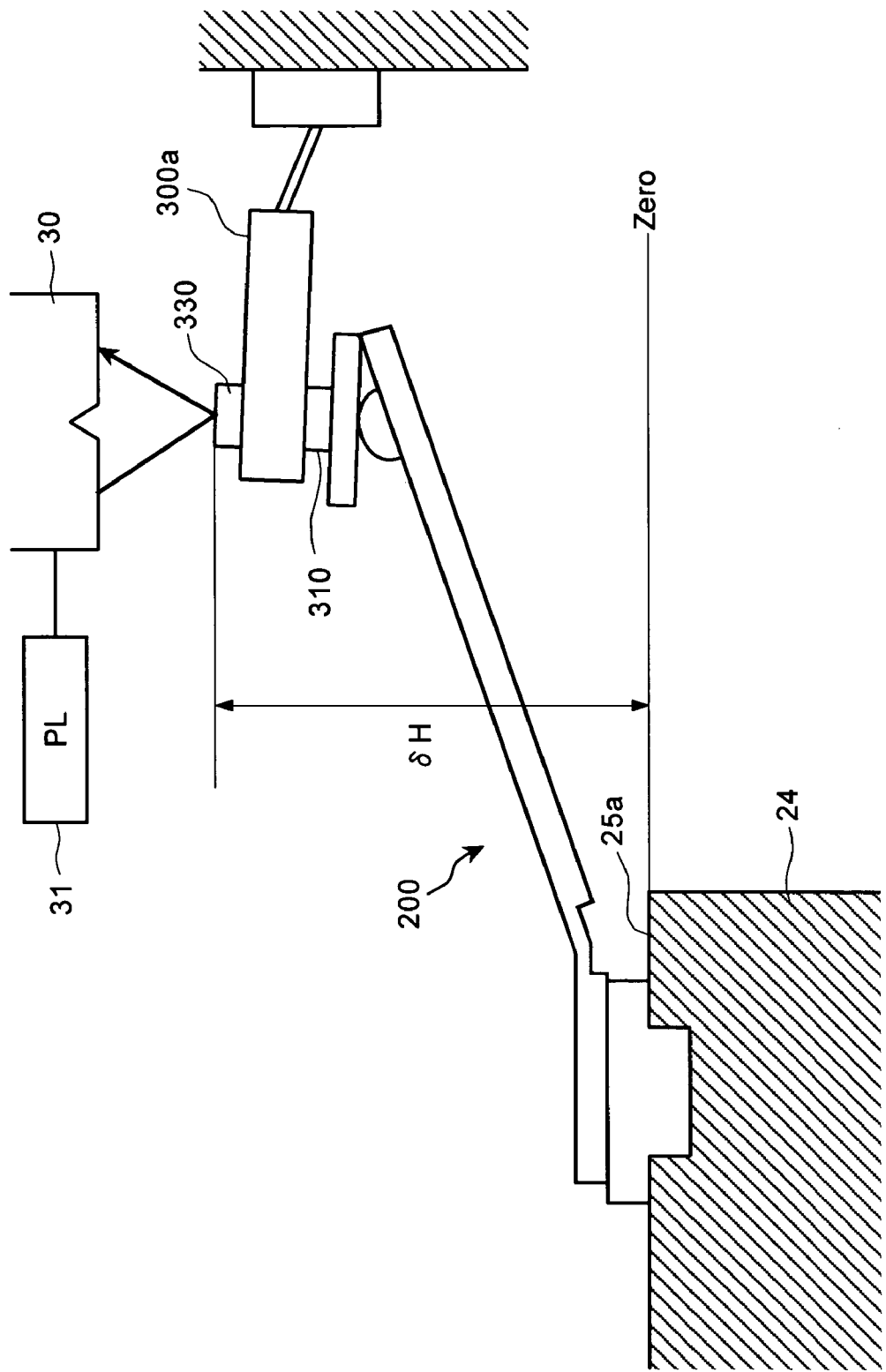
FIG. 4 is a side view showing another step of the spring load correction method according to the embodiment.
Figure 5:
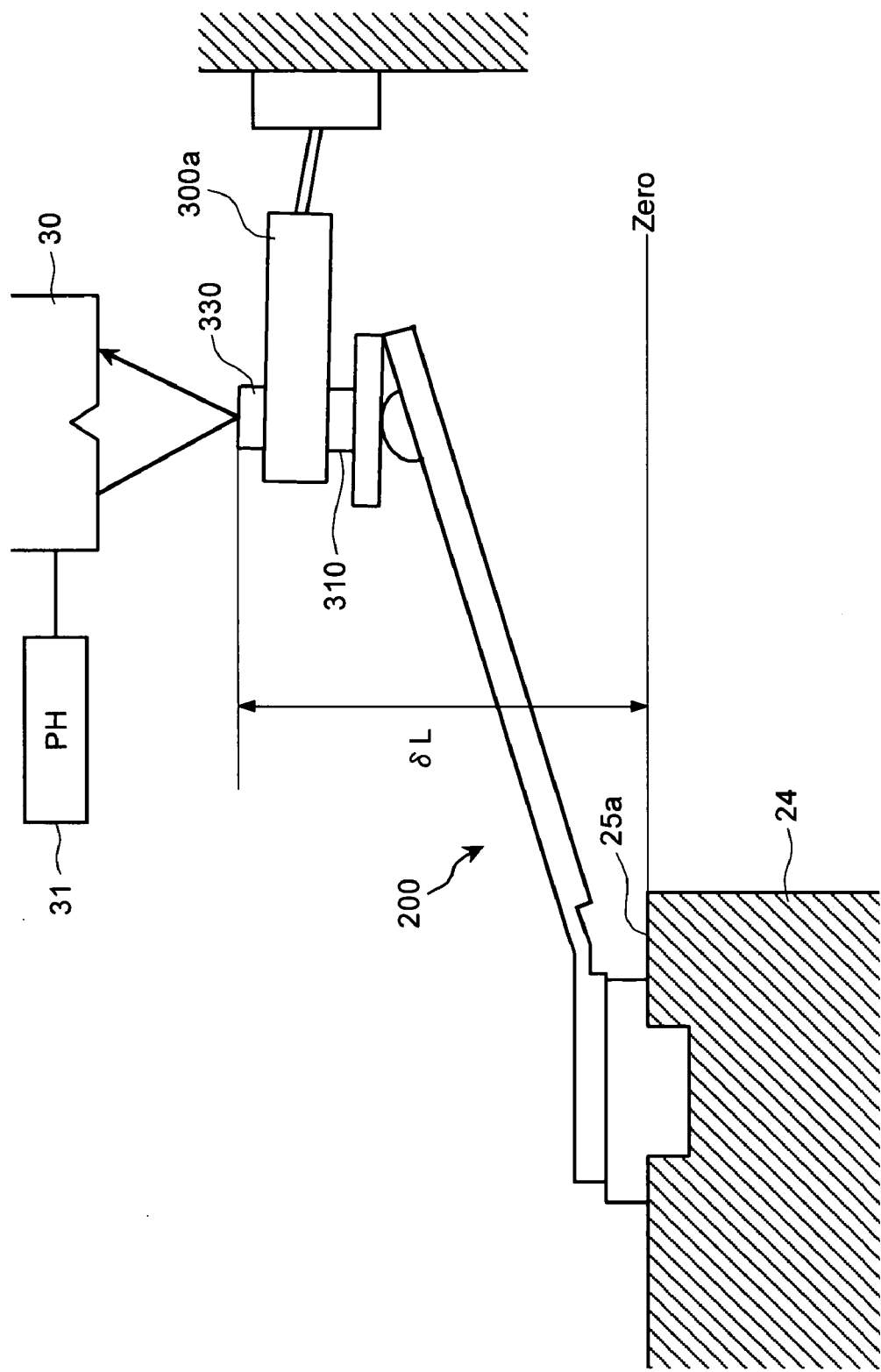
FIG. 5 is a side view showing yet another step of the spring load measurement method according to the embodiment.

Next, as shown in FIGS. 4 and 5, heights of the laser irradiated section 330 and loads on the suspension 200 are measured at two points of different heights, respectively. The height of the laser irradiated section 330 is higher than that shown in FIG. 5. The height of the laser irradiated section 330 and the load of the suspension 200 in FIG. 4 are assumed to be δH and PL, respectively. The height of the laser irradiated section 330 and the load of the suspension 200 in FIG. 5 are assumed to be δL and PH, respectively. These heights and loads are plotted on a load-height diagram as shown in FIG. 6.

As shown in FIG. 6, a straight line La is obtained when a point P2 that represents a result of measurement in FIG. 4 and a point P1 that represents a result of measurement in FIG. 5 are joined. This line La corresponds to a spring constant of the suspension. Here, a graph corresponding to the spring constant is obtained by connecting the two plots with a straight line.

Next, when a load at a predetermined height of the suspension 200 is to be obtained, a load P corresponding to δ according to the predetermined height only has to be calculated on the graph La shown in FIG. 6. Conversely, when a height at a predetermined load of the suspension 200 is to be obtained, a height δ corresponding to P according to the predetermined load only has to be calculated on the graph La shown in FIG. 6.

In obtaining a head load of the suspension 200, after setting the height δ to δT=(Zh+thickness of the load probe 310+thickness of the load cell body 300a+thickness of the laser irradiated section 330), a head load PA can be calculated from the graph La.

Next, when an object of measurement is changed to another suspension 200, heights of the laser irradiated section 330 and loads on the suspension 200 are measured at two points of different heights for the suspension 200 in the same manner as described above. Results of the measurement at the two points are plotted on a load-height diagram in the same manner as FIG. 6. Both the plots are connected to obtain a graph corresponding to a spring constant. A load at a predetermined height or a height at a predetermined load for the suspension 200 can be calculated based on the graph.

Note that a portion where a height is detected by the laser displacement gauge 30 may be a portion of the suspension 200 itself instead of a portion of the laser irradiated section 330. In this case, a height near a portion, with which the load probe 310 of the flexure 209 is in contact, can be calculated by the laser displacement gauge 30. Heights of the suspension 200 itself and loads on the suspension 200 are measured at two points of different heights, respectively. The heights of the suspension 200 itself is assumed to be δH and δL to prepare a load-height diagram. A load at the time when the suspension 200 is at a predetermined height can be calculated based on the load-height diagram. Next, the suspension 200 is corrected using a laser (not shown) based on the load of the suspension of the suspension 200, which is measured accurately as described above, such that a load set as a target value is obtained.

According to the spring load correction method according to the second embodiment, an accurate load with an amount of bending of the tip of the load cell 300 cancelled can be calculated.

In addition, since a spring constant of each spring (suspension 200) is measured, and then a load at a predetermined height is calculated based on the spring constant, more accurate measurement can be performed.

For example, measurement of a load of the suspension for HDD (suspension) 200 will be described. In accordance with the improvement of a density of capacity in a HDD, load, which significantly affects reading and writing of signals, needs to be measured very accurately. A leaf spring section 202 (see FIG. 1) of this suspension 200 is formed by rolling or half etching. A thickness of the leaf spring section 202 (see "t" in FIG. 1) fluctuates by several percents in the rolling and several tens percents in the half etching. Thus, it is difficult to control the fluctuation within a load tolerance. On the other hand, in this embodiment, a spring constant is measured for each of the suspensions 200, which are objects of measurement, and then a load at a predetermined height or a height at a predetermined load for each of the suspensions 200 is calculated. This is effective for solving the problem of the fluctuation in the thickness of the leaf spring 202.

This embodiment is explained with the suspension 200 as an example. However, the present invention is not limited to this, and the above-mentioned effects can be realized for a spring in general.

Figure 21:
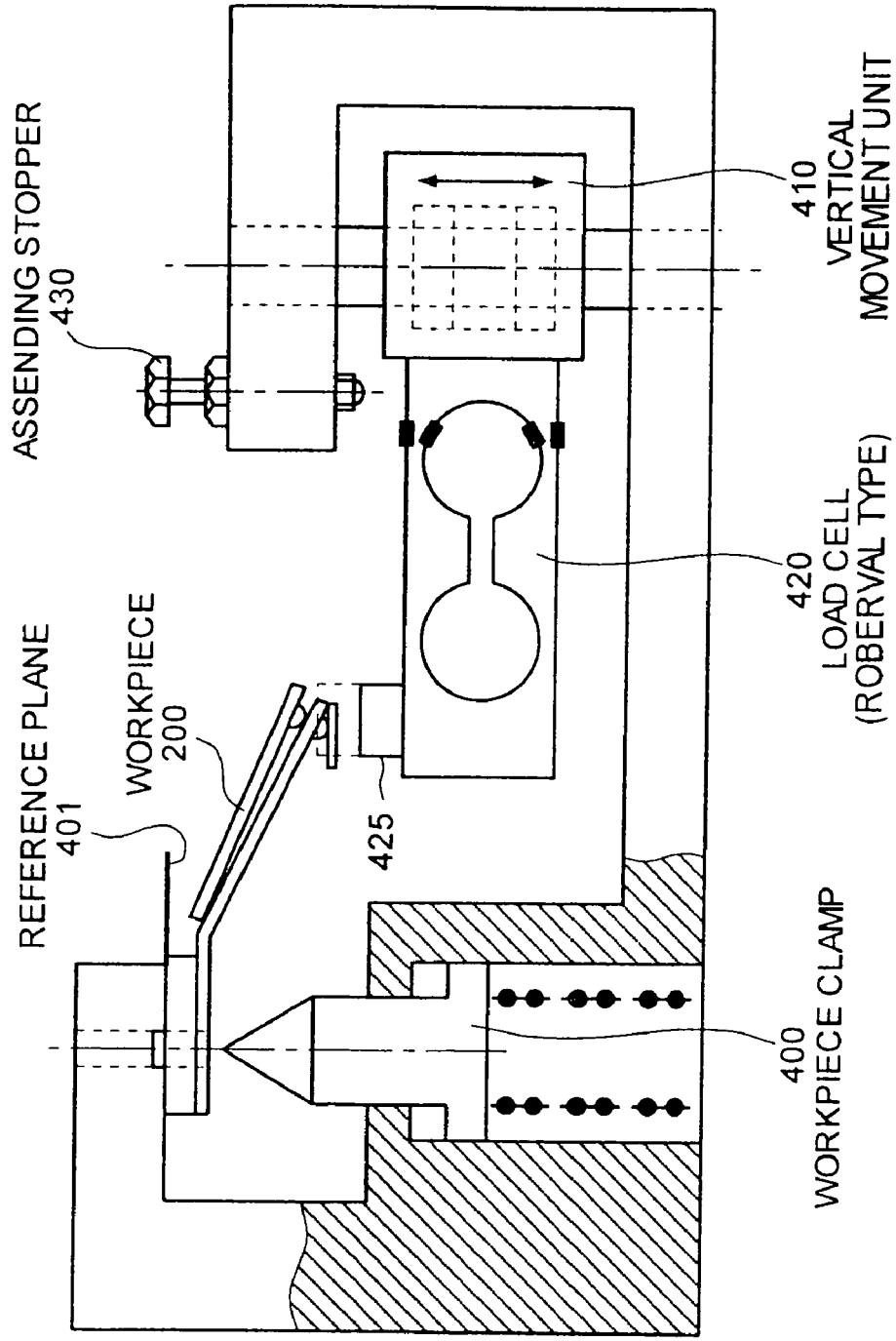
FIG. 21 is a side view showing another method of measuring a head load of the conventional suspension.

Conventionally, as shown in FIG. 21, a tip of a load cell 420 is brought into abutment against a measured section of a workpiece 200, and the workpiece 200 or the load cell 420 is moved to a predetermined height in a load generation direction to measure a load. In this case, the load cell 420 bends in a direction opposite to the workpiece 200 due to a reaction of the workpiece 200. As an example, when a load is 30 grams-force, the load cell 420 bends by 0.012 millimeters. As explained with reference to FIG. 21, usually, the predetermined height is determined in anticipation of this bending. Therefore, accurate measurement cannot be performed when a spring constant is different or when a load is different.

Moreover, according to the second embodiment, a very small load can be measured in very little time. This effect will be hereinafter explained. In measuring a very small load of a spring, it takes several seconds until vertical vibration of a measurement system subsides. This is because, since the number of vibration peculiar to the measurement system is low, amplitude hardly attenuates. On the other hand, in this embodiment, vertical vibration may remain as long as a height and a load at a certain point in time can be measured. In addition, in this embodiment, since loads and heights are measured at two points of different heights, a graph indicating an accurate spring constant can be obtained, which is advantageous in that more accurate measurement can be performed.

Note that, when an electronic balance system is used, it takes several seconds until a spring comes into a balanced state. Thus, the electronic balance system is not suitable for high-speed measurement.

In this embodiment, a load before correction (or during correction) of the suspension 200, which is an object of correction, can be measured accurately. Thus, an amount of correction, which is obtained from comparison of (difference between) a result of the measurement and a set value (target value), can be calculated accurately. As a result, accurate correction can be performed.

In the second embodiment in which heights and loads at two different points are calculated and a spring constant is fond from a height-load diagram, an object for which the heights are measured is the tip of the load cell 300. However, the object may be the housing 320 of the load cell 300 as in the conventional technique. Even in this case, since heights and loads of the housing 320 are measured at plural points to prepare a height-load diagram, more accurate load measurement can be performed compared with the conventional technique.

Next, a third embodiment of the present invention will be explained with reference to FIG. 7.

The first and the second embodiments are characterized in that a load of the suspension 200, which is an object of measurement, can be measured accurately. The third embodiment is a method with which an amount of correction for correcting a load of the suspension 200 to a target value can be calculated accurately.

In the third embodiment, the load-height diagram in the second embodiment is utilized. Since the method of preparing the load-height diagram in the second embodiment is as explained in the second embodiment, the method will not be explained here again. In the following description, a procedure after a load-height diagram (graph La) shown in FIG. 6 is prepared will be explained.

A target value after load correction is set for each suspension 200 that is an object of measurement. The target value is set as a set of two values δT and PT. δT is a predetermined height (usually, a height corresponding to a state in which the slider 210 is in contact with the magnetic disk 21, rotation of which is stopped), and PT is a load (set value) that should be generated at the height δT.

Figure 7:
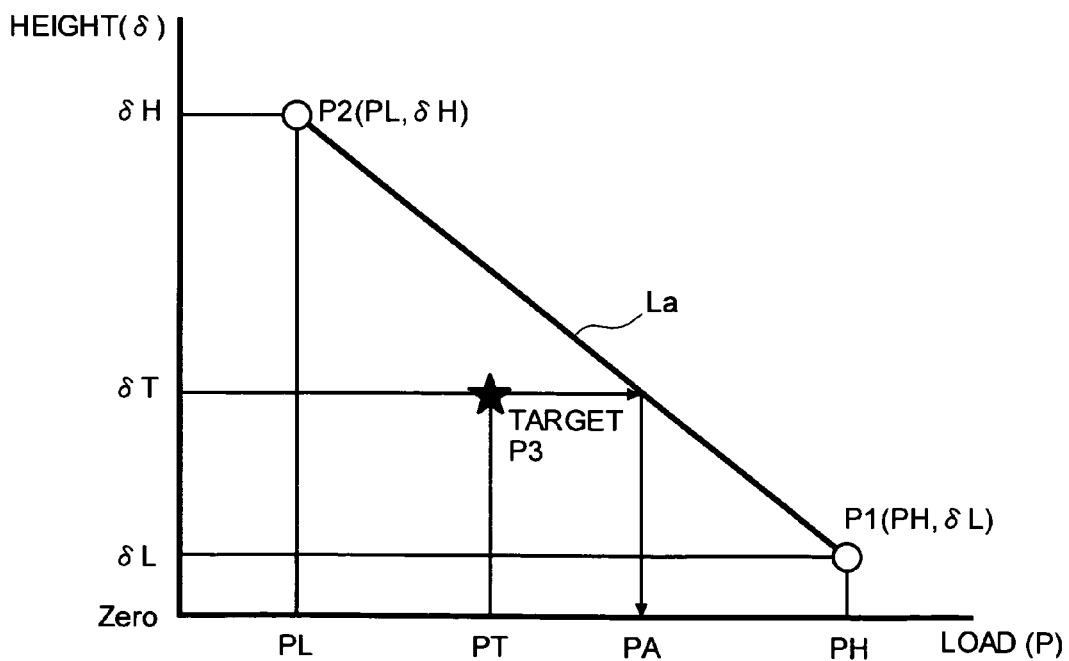
FIG. 7 is a graph showing a load-height diagram used in a spring load measurement method according to yet another embodiment, in which a load value at a set height is indicated.

As shown in FIG. 7, the target value (δT, PT) is plotted in load (P)-height (δ) coordinates shown in FIG. 6.

Figure 8:
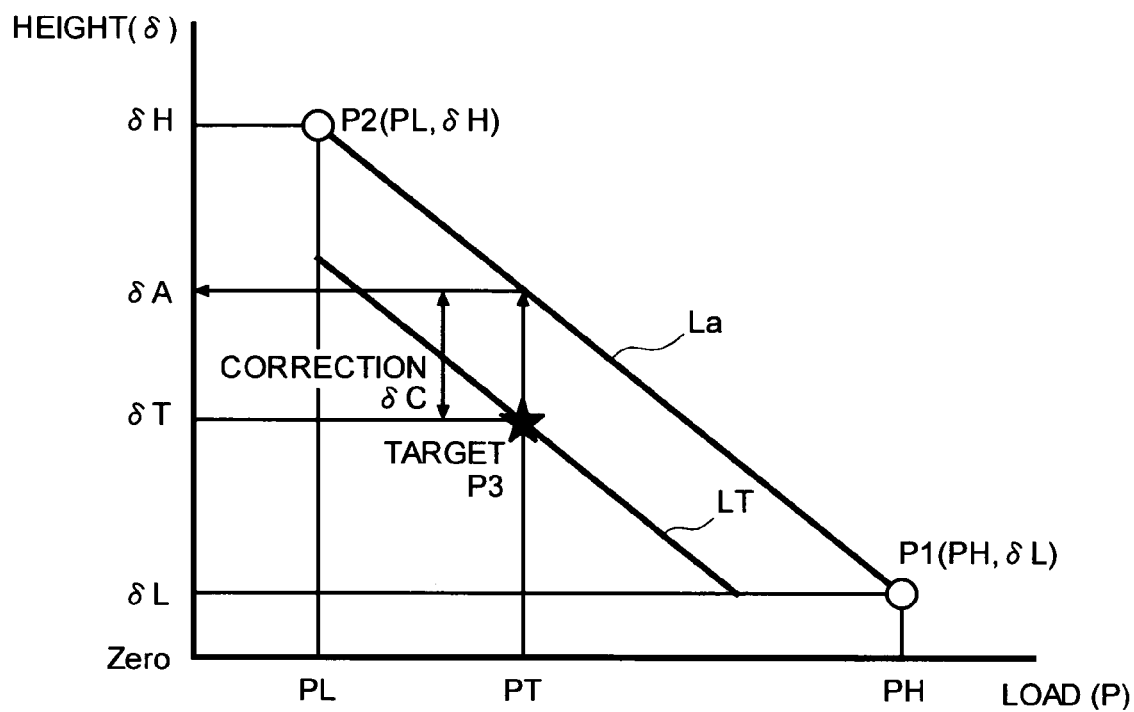
FIG. 8 is a graph showing a load-height diagram used in the spring load measurement method according to the embodiment, in which an amount of correction is indicated.

Next, as shown in FIG. 8, the target load PT is substituted on the graph La to calculate a height δA at the load PT. A difference δc between δA and δT is an amount of correction.

Next, while the suspension 200, which is an object of measurement, is fixed to measure a free height thereof, a height of the suspension 200 is corrected by an amount of δc. For this correction, bending by laser irradiation, setting by heating, and the like are effective. This δc is an amount of correction of the free height for adjusting the load PA (see FIG. 6) to the target load PT.

Thereafter, the free height of the suspension 200 is adjusted to the required amount of correction δc. For this correction, bending by laser irradiation, setting by heating, and the like are effective.

A database for correction, in which experimental data are accumulated, is created, and the correction is performed based on the database. For example, in the correction by laser irradiation, correction according to various combinations of laser output power, an irradiation position, and an irradiation shape is performed plural times to accumulate correspondence between the irradiation conditions and amounts of correction result as a database. A combination of the irradiation conditions corresponding to the actual required amount of correction (δc) is selected based on this database, and laser irradiation is performed based on the combination to perform load correction.

This correction method for establishing a database is not limited to laser irradiation and can be applied to correction by setting. Taking into account a necessary load and a setting resistance property, a preliminary experiment is performed to create a database of set conditions and correction results of the preliminary experiment. Set conditions for the setting only have to be determined from the database when the necessary amount of correction is successfully measured.

The above-mentioned work is performed for each of the ten suspensions 200 (springs) that are objects of measurement. This makes it possible to perform accurate load correction that is not influenced by fluctuation of spring constants.

More specifically, it is known that, even if a load of the suspension 200 is corrected according to the correction method such as laser irradiation or setting, a spring constant of the suspension 200 does not change before and after the correction. An inclination of the graph La on the load (P)-height (δ) corresponding to a spring load does not change after the correction. A relation between the load (P) and the height (δ) of the suspension 200 after the correction is indicated by a straight line parallel to the graph La. Therefore, the suspension 200 only has to be corrected such that the load and the height thereof correspond to a straight line that passes the target value (δT, PT) and is parallel to the graph La.

In this case, for example, in measuring a very small load with a resolution of 10 milligrams or less, it is difficult to measure the very small load fast and accurately because an output signal is small. On the other hand, it is easy to measure the height δ in an order of micrometer. Therefore, the work for adjusting a height can be performed inexpensively and fast compared with the work for directly correcting a load.

Next, a specific procedure will be explained with reference to FIG. 9.

In the following description, δT is referred to as a set height, and PT is referred to as a target load.

A load-height diagram (graph) is represented as y=ax+b.
<1> First, an inclination "a" of a straight line passing two points of P1 and P2 is calculated (see <1> in FIG. 9).

$a=(\delta H-\delta L)/(PL-PH)$

<2> The P1 point is substituted into the graph to calculate a Y intercept (see <2> in FIG. 2).

$b=\delta L-axPH$

<3> The target load PT is substituted into the above expression to calculate the height δA (see <4> in FIG. 9).

$\delta A=axPT+b$

<4> An amount of movement δc in a Y direction for causing the calculated straight line to pass a target point P3 (PT, δT) is calculated (see <5> in FIG. 9). This δc is equivalent to an amount of correction of a free height.

$\delta c=\delta T\times 1000-\delta A$

<5> A new Y intercept b' after height correction is calculated using a load measurement value (P', δ') after correction (see <6> in FIG. 9).

$b'=\delta'-axP'$

<6> The set height δT is substituted into a new load-height diagram after correction to calculate a load PA' (see <7> in FIG. 9).

In the above description, the load correction for the suspension 200 is performed as described below. The suspension 200, which is an object of measurement, is clamped to reset a height, at the time when the suspension 200 is free, to zero. The height, at the time when the suspension 200 is free (free height), is corrected after the reset. A target amount of correction is δc described above. For this correction, laser bending, thermal correction, cold setting, and the like are effective.

Note that, in the above description, a method of measuring a height of the suspension 200 at the time when it is free and resetting the height to zero is the same as the origin adjustment step in the second embodiment except that the "zero adjustment gauge 50" is read as the "suspension 200".

According to the load correction method in this embodiment, the following effects can be realized.

It is more easy to measure a height accurately than to measure a load accurately, and the measurement of the height can be processed in a short time. Therefore, if the amount of height correction (δc) is calculated in the above-mentioned procedure and a free height of a spring is corrected while a height of the spring is measured (monitored) on a real time basis, accurate load correction can be performed. This embodiment is explained with the suspension 200 as an example. However, the present invention is not limited to this, and the above-mentioned effects can be realized for a spring in general.

As in the above description, for example, correction of the suspension for HDD (suspension) 200 will be described. As described above, a leaf spring section 202 (see FIG. 1) of the suspension 200 is formed by rolling or half etching. A thickness of the leaf spring section 202 (see "t" in FIG. 1) fluctuates in the rolling and the half etching. Thus, it is difficult to control the fluctuation within a load tolerance.

On the other hand, in this embodiment, if spring constants are measured for the suspensions 200, which are objects of measurement, and then the amount of correction δc for each of the suspensions 200 is calculated to correct a load, the fluctuation of the thickness can be cancelled, and accurate load correction can be performed.

Next, the effects of a third embodiment will be verified based on a result of an experiment.

FIG. 10 is a diagram showing a result of correction at the time when a spring constant was calculated by measuring loads at two points to perform load correction for each of ten suspensions 200.

As conditions for an experiment in FIG. 10, the set height δT is 0.48 millimeters and the target load PT at the set height is 2.5 grams-force. Numbers are numbers for the ten suspensions 200 that are objects of measurement. FIG. 10 corresponds to FIG. 9 explained above.

A section of "correction result" in FIG. 10 indicates a result of correction in an attempt to correct heights of the suspensions 200 by amounts of the "correction target" δc. For example, it is indicated in number 1 that, whereas it was attempted to correct a height by −150 micrometers, an actual result of correction was −155 micrometers.

For the ten suspensions 200, whereas an average of loads was 2.824 grams-force and a standard deviation σ was 0.045 before the correction, the average of loads was 2.510 grams-force and the standard deviation σ was 0.014 after the correction.

FIG. 11 shows a result of correction performed under the same conditions for an experiment as FIG. 10 for the suspensions 200 different from those shown in FIG. 10. For the ten suspensions 200 in FIG. 11, whereas the average of loads was 2.731 grams-force and the standard deviation σ was 0.055 before the correction, the average of loads was 2.514 grams-force and the standard deviation σ was 0.012 after the correction.

FIG. 12 shows a result of correction performed under the same conditions for an experiment as FIG. 10 for the suspensions 200 different from those shown in FIG. 10 or 11. For the ten suspensions 200 in FIG. 12, whereas the average of loads was 2.782 grams-force and the standard deviation σ was 0.037 before the correction, the average of loads was 2.510 grams-force and the standard deviation σ was 0.006 after the correction.

A bottom column in FIG. 12 indicates a result of an experiment for the thirty suspensions 200 in total in FIGS. 10 to 12. Whereas the average of loads was 2.779 grams-force and the standard deviation σ was 0.059 before the correction, the average of loads was 2.511 grams-force and the standard deviation σ was 0.011 after the correction.

As shown in FIGS. 10 to 12, as results of correcting the thirty works, respectively, aiming at the target load 2.5 grams-force, 0.011 grams were obtained in the standard deviation σ indicating fluctuation. As a highest level in the suspension manufacturing industry, the standard deviation σ is 0.02 grams-force as of the end of 2002, which indicates that this embodiment is advantageous. In this experiment, a height displacement gauge with resolution of ±2 μm was used. However, better correction is possible if a more accurate sensor is used.

In the results of the experiments performed for the thirty works in FIGS. 10 to 12, the average load after the correction was 2.510 grams-force, which was higher than 2.5 grams-force of the target load PT by 0.01 grams-force. Thus, a virtual target load was lowered by 0.01 grams-force to perform correction. FIG. 13 shows a result of the correction in that case. As shown in FIG. 13, as a result, the load was lower than the true target load PT of 2.5 grams-force by 0.013 grams-force. However, improvement of accuracy is possible by further accumulating data.

Figure 15:
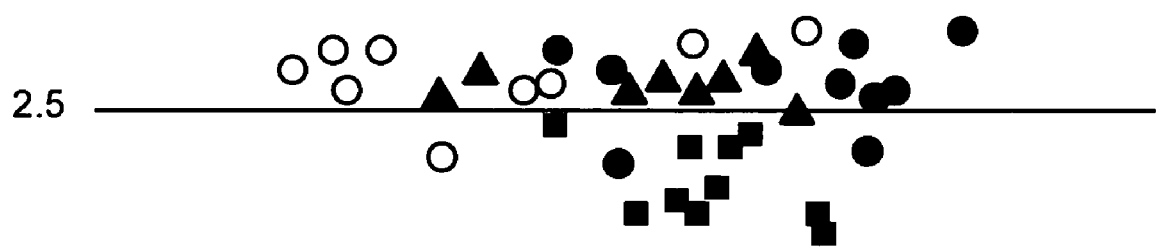
FIG. 15 is a graph for explaining the effects of the spring load correction method according to the embodiment.

FIG. 14 shows the results of the experiments in FIGS. 10 to 13 as a form of plots of loads before correction and load after correction. FIG. 15 is a diagram showing the periphery of the group of plots in FIG. 14 in an enlarged form. In these figures, points of a square mark indicate a result at the time when correction was performed with the virtual target load shown in FIG. 13 lowered by 0.01 grams-force. Points of a white circle mark, a black circle mark, and a triangle mark indicate the results of the three experiments in FIGS. 10 to 12, respectively.

As shown in FIGS. 14 and 15, the loads before correction distribute widely in the X-axis direction from one below 2.7 grams-force to one exceeding 2.8 grams-force. On the other hand, the loads after correction in the Y-axis direction distribute centering around the target load of 2.5 grams-force. Thus, it is seen that the correction in this embodiment was performed accurately.

In the conventional correction method, a load is confirmed every time the load is corrected. However, in this embodiment, it could be proved that the target load PT can be controlled arbitrarily and accurately by managing a height.

In a fourth embodiment, setting for a spring (e.g., the suspension 200) is performed using the constitution of the third embodiment.

For increasing a setting property of a spring, the setting is effective means. The setting means that, when a load is applied to the spring, a residual stress in a negative direction is added to a spring section, and a setting-resistance performance is improved.

Conventionally, regardless of an individual difference of a spring (the thickness t of the spring section in FIG. 1, etc.), a load is uniformly applied up to a fixed height, or a fixed load is applied uniformly. However, this method results in a difference of a residual stress depending upon a spring.

In this embodiment, since a free height of a spring and a spring constant are known, a thickness of a spring section can be calculated from strength of materials. This makes it possible to perform setting in which a residual stress is fixed. In other words, since a residual stress after the setting can be set accurately, secular change and setting-resistance performances improve.

In a fifth embodiment, a load of a spring (e.g., the suspension 200) is corrected with a fixed stress using the constitution of the third embodiment.

The spring (e.g., the suspension 200) may be tightened by cold rolling or hot pressing to subject the sprint to setting, and adjust a load to a target value. Conventionally, regardless of an individual difference of a spring, a load is uniformly applied up to a fixed height, or a fixed load is applied uniformly.

However, in this method, since a tightening stress varies depending upon a spring, there is a defect in correction accuracy.

In this embodiment, since a free height of a spring and a spring constant are known, a thickness of a spring section can be calculated. This makes it possible to perform setting in which a residual stress is fixed. This makes it possible to perform accurate load correction.

In the first to the fifth embodiments, a head load is measured with respect to the suspension 200 not yet mounted with the slider 210. On the other hand, in the embodiments, it is also possible to measure a head load with respect to the suspension 200 mounted with the slider 210. As a measurement method in that case, all what should be performed is that, in the explanation of the first and the second embodiments, an object against which the load probe 310 of the load cell 300 is brought into abutment is changed from the flexure 209 to the slider 210 mounted on the flexure 209, and in utilizing a result of measurement of the laser displacement gauge 30, a thickness of the slider 210 is taken into account.

If a height of the tip of the load cell 300 is calculated in a state in which the slider 210 is attached, since a height (thickness of an adhesive, etc.) involved in attachment of the slider 210 can be taken into account, a head load at the time when the slider 210 actually comes into contact with the magnetic disk 21 can be measured more accurately.

Figure 16:
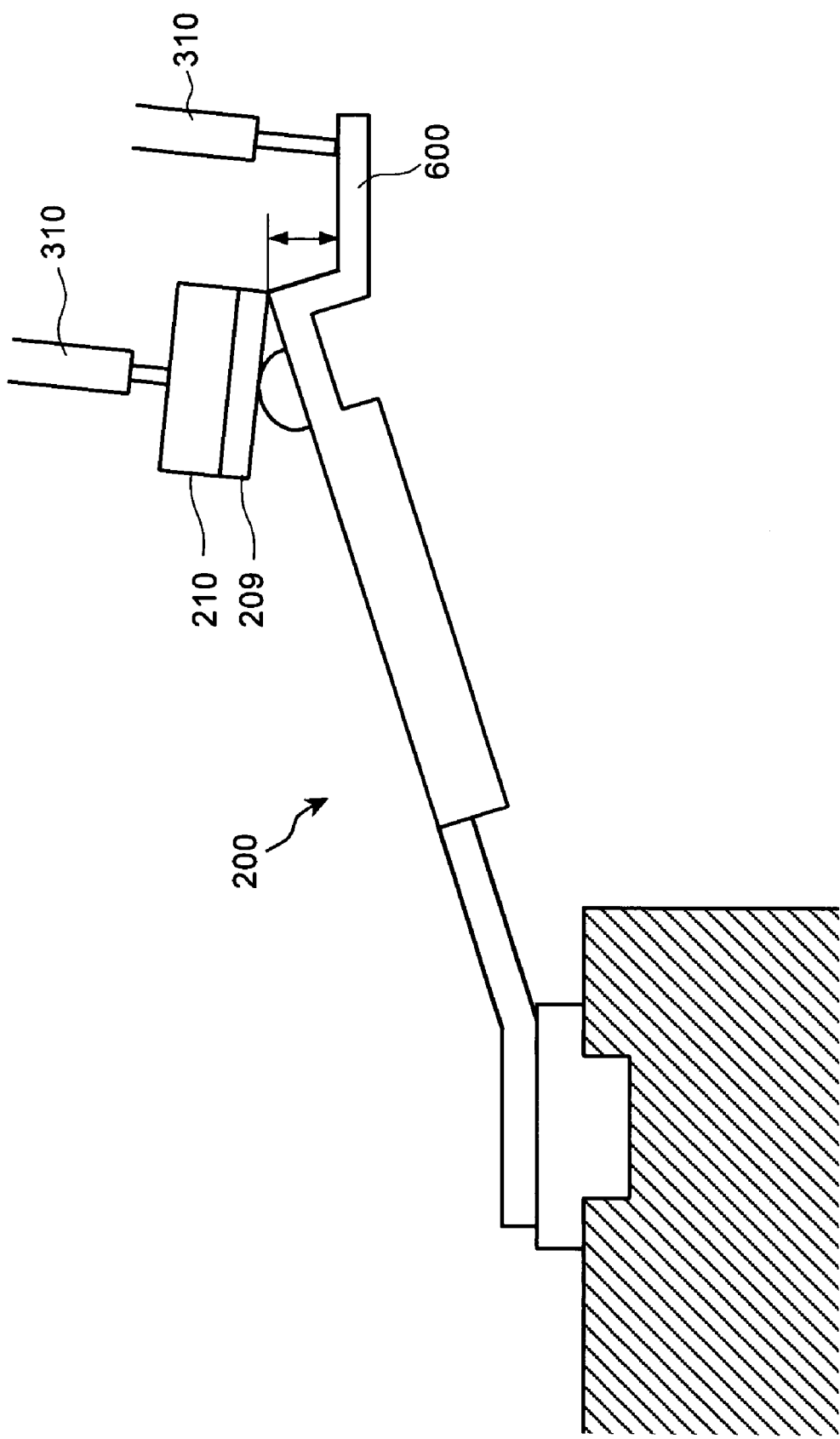
FIG. 16 is a side view showing a spring load correction method according to yet another embodiment of the present invention.
Figure 17:
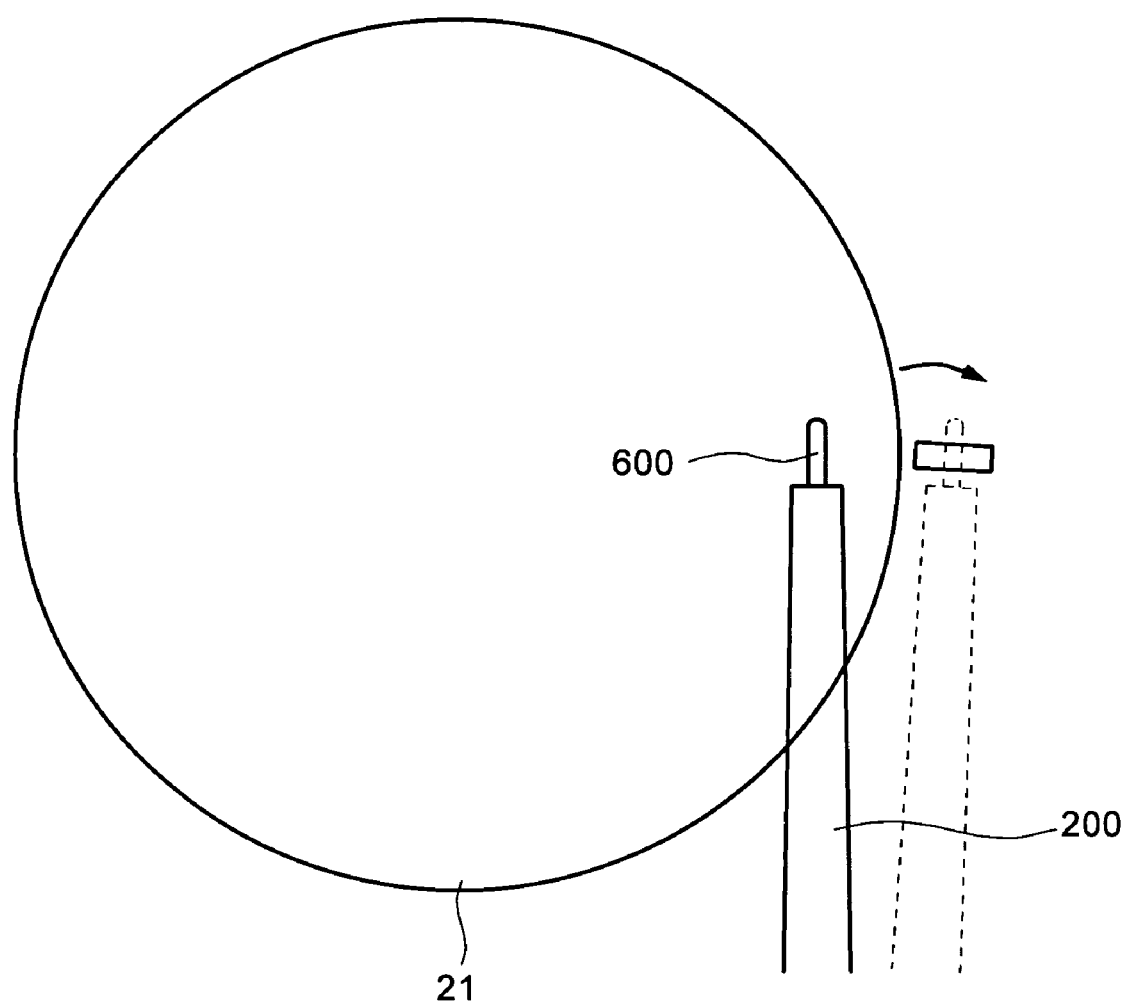
FIG. 17 is a plan view for explaining the spring load correction method according to the embodiment.
Figure 18:
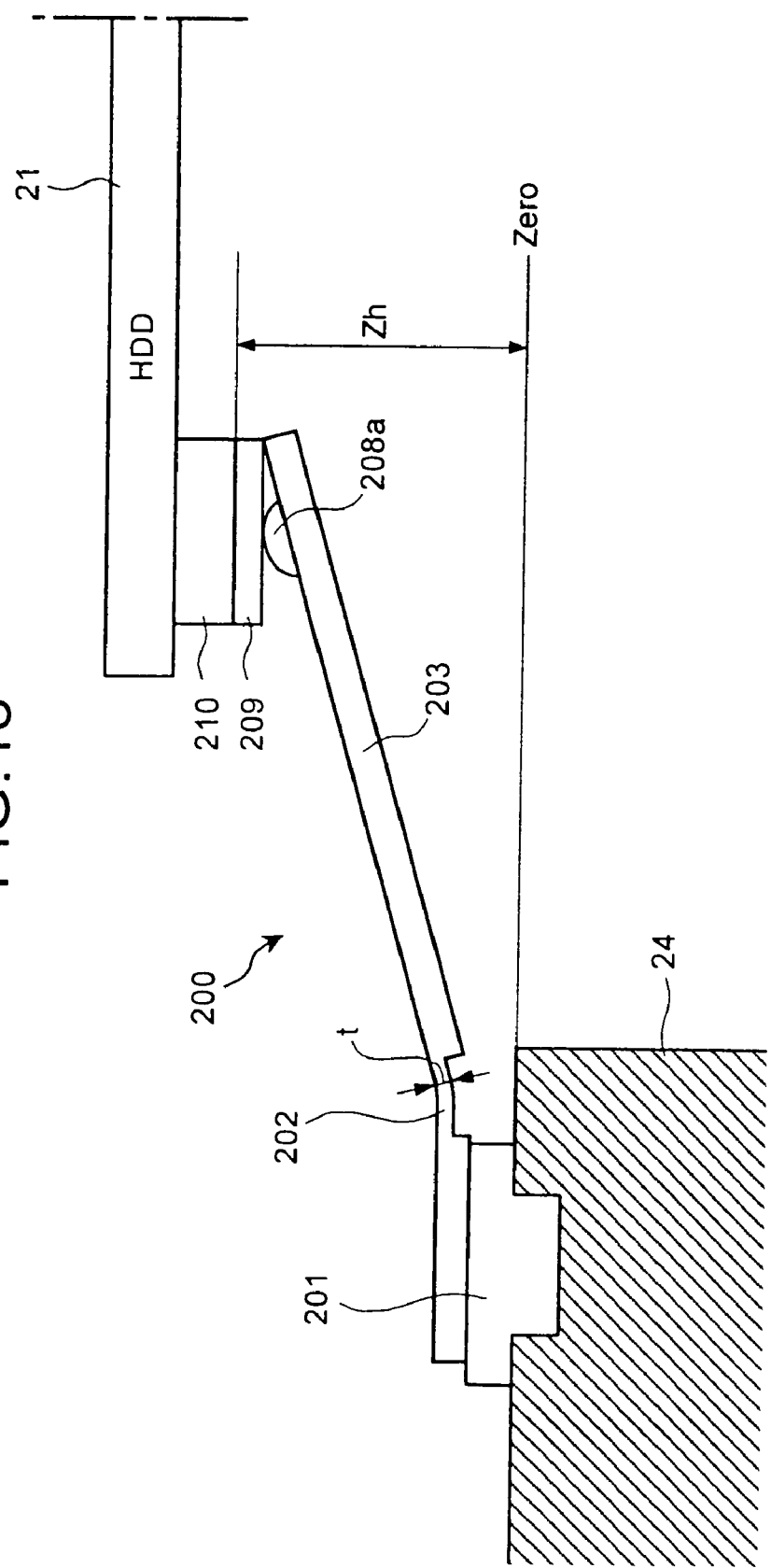
FIG. 18 is a side view showing a use form of a conventional general suspension.
Figure 19:
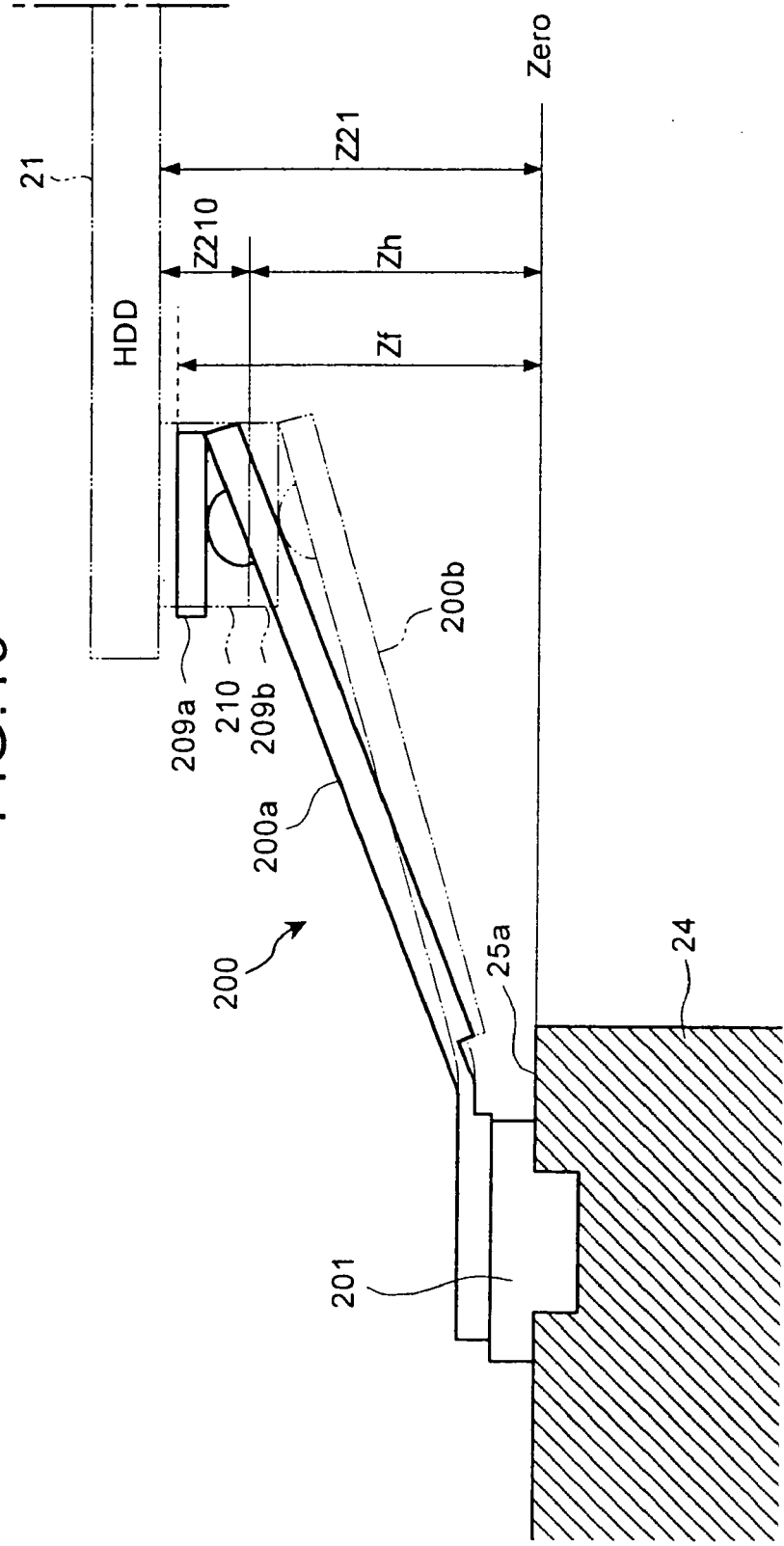
FIG. 19 is a side view showing a height of the conventional general suspension at the time when it is free.

A sixth embodiment of the present invention will be explained with reference to FIGS. 16 and 17. In the sixth embodiment, it is assumed that spring constants of the suspensions 200 are known using the constitution of the third embodiment.

In accordance with an increase in accuracy of a HDD, importance of a posture and a load of the slider 210 increases.

Conventionally, after the slider 210 is adhered to the flexure 209, the load probe 310 of the load cell 300 is brought into abutment against the slider 210 to measure a load. In that case, a stationary posture of the slider 210 is affected by the load probe 310 and changes slightly.

Thus, in order to avoid the change in the stationary posture of the slider 210, the load probe 310 is brought into abutment against a chip tab 600 to measure a load. As shown in FIG. 17, in retracting the slider 210 to the outside of an outer edge of the magnetic disk 21 from a position above the magnetic disk 21 when the magnetic disk 21 is stopped, this chip tab 600 is lifted to mechanically move the suspension 200. The chip tab 600 is set as a pressurizing point, where the slider 210 is pressurized by the load probe 310, because the pressurization does not affect the stationary posture of the slider 210.

However, since there is a step height between the chip tab 600 and the slider 210, fluctuation in a height direction of the step height cannot be eliminated in processing. For example, there is fluctuation of ±20 to 25 micrometers. This fluctuation in the step height of the chip tab 600 results in an error. In addition, the thickness of the adhesive for adhering the slider 210 also results in an error. Thus, in this embodiment, a load of the slider 210 can be estimated by a method described below:

(1) While the laser displacement gauge 30 measures a height of an upper surface of the slider 210 (head), the load cell 300 is lowered to calculate a load at an accurate set height, (2) Loads at two points are measured by the method of (1) and a spring constant is calculated, whereby measurement accuracy is increased, and (3) A corrected height is calculated after the spring constant is calculated to perform load correction accurately.

With this method, a load of the slider 210 can be estimated without touching the slider 210.

In accordance with an increase in a capacity of a HDD, a load of the suspension 200 has become smaller, moreover, the load needs to measured more accurately. Conventionally, the load cell 300 is used to measure the load; however, there was a problem that the measurement was inaccurate due to clearance of the load cell 300. On the contrary, according to the present invention, displacement of the load cell 300 is measured together with the load to prepare a load-bending diagram according to arithmetic operation processing and estimate a load at a predetermined height from the diagram. Therefore, the load on the spring can be measured more accurately so that the method can be used in manufacturing of improved springs.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of correcting a suspension including a suspension body, which is provided with a magnetic head, and a chip tab unit, which is formed in the suspension body so as to have a step height, comprising:

(t) calculating a spring constant of the suspension;
(u) measuring a load of the chip tab unit with a load probe;
(v) measuring an elevation of the magnetic head in a state when the (u) is performed;
(w) multiplying the load measured at (u) by a lever ratio of the load probe and a dimple position to calculate a load at a position of the magnetic head; and
(x) correcting a load equivalent to an elevation error in the measuring an elevation of the magnetic head based on the spring constant calculated.

2. The method according to claim 1, wherein (t) includes bringing a load measurement device into contact with the suspension,
positioning the load measurement device, while in contact with the suspension, at a first elevation and measuring a load of the suspension as a first load;
positioning the load measurement device, while in contact with the suspension, at a second elevation and measuring a load of the suspension as a second load; and
calculating the spring constant from the first elevation, the second elevation, the first load, and the second load.

3. The method according to claim 1, wherein (t) includes bringing a load measurement device into contact with the suspension;
positioning the load measurement device, while in contact with the suspension, at a first elevation, measuring an elevation of a specific portion of the load measurement device, which is in contact with the suspension directly or indirectly, as a second elevation, and measuring a load of the suspension, as a first load;
positioning the load measurement device, while in contact with the suspension, at a third elevation, which is different from the first elevation, measuring an elevation of a specific portion of the load measurement device as a fourth elevation, and measuring a load of the suspension as a second load; and
calculating the spring constant from the second elevation, the fourth elevation, the first load, and the second load.

4. The method according to claim 2, wherein
the first elevation is higher than a total of the specific elevation and a height of the load measurement device, and
the second elevation is lower than the total of the specific elevation and a height of the load measurement device.

5. The method according to claim 3, wherein
the first elevation is higher than a total of the specific elevation and a height of the load measurement device, and
the second elevation is lower than the total of the specific elevation and a height of the load measurement device.

6. The method according to claim 1, wherein (t) includes positioning the suspension, while in contact with the load measurement device, at a first elevation, measuring a load of the suspension as a first load;
positioning the suspension, while in contact with the load measurement device, at a second elevation, which is different from the first elevation, measuring a load of the suspension as a second load; and
calculating the spring constant based on the first elevation, the second elevation, the first load, and the second load.

7. The method according to claim 6, wherein
the first elevation is higher than the specific elevation, and the second elevation is lower than the specific elevation.

8. The method according to claim 1,
wherein the suspension supports a magnetic head of a hard disk drive.

9. The method according to claim 8,
wherein the load measurement device makes a physical contact with the suspension via the magnetic head.

10. A device that corrects a spring, the spring having a fixed end and a free end, the free end when elevated to a specific elevation from the fixed end produces a load on an object, comprising:
- a spring constant calculating unit that calculates a spring constant of the spring;
- a correction amount calculating unit that calculates a load correction amount for correcting a load of the spring using the spring constant; and
- a correcting unit that corrects the spring based on the load correction amount.

11. The device according to claim 10, further comprising:
an elevation detecting unit that detects an elevation of the spring at the time when the spring is free,
wherein the spring is corrected such that the elevation, at the time when the spring is free, changes by the amount of correction of the spring while a result of the detection of the elevation detecting unit is monitored.

12. The device according to claim 10, further comprising a load measurement device that comes into contact with the spring to measure a load of the spring,
wherein the spring constant calculating unit calculates the spring constant based on
- a second elevation of a specific portion of the load measurement device that is in contact with the spring and set at a first elevation, which is in contact with the spring directly or indirectly, measured by the elevation detecting unit;
- a first load of the spring, which is in contact with the load measurement device set at the first elevation, measured by the load measurement device;
- a fourth elevation of a portion of the load measurement device in contact with the spring and set at a third elevation, which is different from the first elevation, which is in contact with the spring directly or indirectly, measured by the elevation detecting unit; and
- a second load value, which is in contact with the load measurement device set at the third elevation, measured by the load measurement device.

* * * * *